US012716485B2

(12) United States Patent
Cox et al.

(10) Patent No.: US 12,716,485 B2
(45) Date of Patent: Aug. 25, 2026

(54) SLIP SPEED MONITORING OF A MULTI-SPEED PLANETARY TRANSMISSION

(71) Applicant: Allison Transmission, Inc., Indianapolis, IN (US)

(72) Inventors: Tristan Cox, Whitestown, IN (US); Randall S. Conn, Avon, IN (US); Lian Yu, Whitestown, IN (US); Joel Taina, Pittsboro, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 19/054,221

(22) Filed: Feb. 14, 2025

(65) Prior Publication Data

US 2026/0243343 A1 Aug. 20, 2026

(51) Int. Cl.

| | |
|---|---|
| ***F16H 3/62*** | (2006.01) |
| ***F16H 59/38*** | (2006.01) |
| ***F16H 61/02*** | (2006.01) |
| ***F16H 61/04*** | (2006.01) |

(52) U.S. Cl.

CPC ............... *F16H 61/04* (2013.01); *F16H 3/62* (2013.01); *F16H 59/38* (2013.01); *F16H 61/0204* (2013.01); *F16H 2061/0462* (2013.01)

(58) Field of Classification Search

CPC ...... F16H 61/04; F16H 59/38; F16H 61/0204; F16H 2061/0462; F16H 3/62; F16H 2200/006; F16H 2200/201; F16H 2200/2012

See application file for complete search history.

(56) References Cited

U.S. PATENT DOCUMENTS

| | | | |
|---|---|---|---|
| 4,527,678 | A | 7/1985 | Pierce et al. |
| 4,732,246 | A | 3/1988 | Tateno et al. |
| 4,768,636 | A | 9/1988 | Ito et al. |
| 5,070,747 | A | 12/1991 | Lentz et al. |

(Continued)

OTHER PUBLICATIONS

Ji, Yonghyeok, et al.; A study on the Anomaly Detection of Engine Clutch Engagement/Disengagement Using Machine Learning for Transmission Mounted Electric Drive Type Hybrid Electric Vehicles; Applied Sciences; 21 pages; Oct. 30, 2021.

(Continued)

*Primary Examiner* — Tisha D Lewis

(74) *Attorney, Agent, or Firm* — Faegre Drinker Biddle & Reath LLP

(57) ABSTRACT

A multi-speed transmission including a plurality of planetary gearsets and a plurality of selective couplers to achieve at least eight forward speed ratios is disclosed. The plurality of planetary gearsets may include a first planetary gearset, a second planetary gearset, a third planetary gearset, and a fourth planetary gearset. The plurality of selective couplers may include a number of clutches and a number of brakes. The multi-speed transmission may have four planetary gearsets and six selective couplers. The six selective couplers may include two clutches and four brakes. A planetary transmission controller may be used to control the plurality of selective couplers and monitor a health condition of the plurality of selective couplers. Speed sensors on select rotating components is sufficient to monitor slip speeds across all of the plurality of selective couplers.

23 Claims, 8 Drawing Sheets

(56) References Cited

U.S. PATENT DOCUMENTS

| | | | | |
|---|---|---|---|---|
| 5,551,930 | A | 9/1996 | Creger et al. | |
| 5,611,750 | A | 3/1997 | Kono et al. | |
| 6,188,943 | B1 | 2/2001 | Uchida et al. | |
| 6,253,140 | B1 | 6/2001 | Jain et al. | |
| 7,188,017 | B2 | 3/2007 | Rodrigues et al. | |
| 9,625,007 | B2 | 4/2017 | Long et al. | |
| 11,845,438 | B1 * | 12/2023 | Sullivan | F16H 59/48 |
| 2004/0106490 | A1 * | 6/2004 | Park | F16H 3/666 475/275 |
| 2014/0025269 | A1 | 1/2014 | Ayabe et al. | |
| 2016/0076643 | A1 * | 3/2016 | Pellerito | F16H 59/46 701/62 |
| 2022/0364629 | A1 * | 11/2022 | Patel | F16H 3/66 |

OTHER PUBLICATIONS

Ramalingam, Sivakumar et al.; Integrated Prognostics Observer for Condition Monitoring of an Automated Manual Transmission Dry Clutch System; International Journal of Prognostics and Health Management 8.2; 9 pages; 2017.

Olsson, Tomas, et al.; Fault Diagnosis of Heavy Duty Machines: Automatic Transmission Clutches; International Conference on Case-Based Reasoning: Workshop on Synergies between CBR and Data Mining; 10 pages; 2014.

Källström, Elisabeth; On-board Feature Extraction for Clutch Slippage Deviation Detection; Diss. Lule Tekniska Universitet; 116 pages; 2015.

Källström, Elisabeth et al.; On-board Clutch Slippage Detection and Diagnosis in Heavy Duty Machine; International Journal of Prognostics and Health Management, 14 pages; 2018.

* cited by examiner

200

| Gear | 162 | 164 | 166 | 168 | 170 | 172 |
|---|---|---|---|---|---|---|
| N | | | | | | |
| 1st | | X | | | X | |
| 2nd | X | | | | X | |
| 3rd | | X | | X | | |
| 4th | | X | | | | X |
| 5th | X | | | X | | |
| 6th | X | | | | | X |
| 7th | | X | X | | | |
| 8th | X | | X | | | |

'X' = ENGAGED CONFIGURATION
'BLANK' = DISENGAGED CONFIGURATION

Fig. 2

| C1 | $Avg^{Max}$ | $Max_{(all\ time)}$ | Shift Counter |
|---|---|---|---|
| N-1 | | | |
| 1-2 | | | |
| 2-3 | | | |
| ⋮ | | | |
| 7-8 | | | |
| 8-7 | | | |
| ⋮ | | | |
| 2-1 | | | |
| 1-N | | | |

⋮

| $C_n$ | $Avg^{Max}$ | $Max_{(all\ time)}$ | Shift Counter |
|---|---|---|---|
| N-1 | | | |
| 1-2 | | | |
| 2-3 | | | |
| ⋮ | | | |
| 7-8 | | | |
| 8-7 | | | |
| 7-6 | | | |
| ⋮ | | | |
| 2-1 | | | |
| 1-N | | | |

Fig. 4

SLIP SPEED MONITORING OF A MULTI-SPEED PLANETARY TRANSMISSION

FIELD OF THE DISCLOSURE

The present disclosure relates to a multi-speed transmission including a plurality of planetary gearsets and a plurality of selective couplers and in particular to monitoring slip speeds of a plurality of selective couplers of a multi-speed transmission.

BACKGROUND OF THE DISCLOSURE

Multi-speed transmissions use a plurality of planetary gearsets, selective couplers, interconnectors, and additional elements to achieve a plurality of forward and reverse speed ratios. Exemplary multi-speed transmissions are disclosed in U.S. Pat. No. 9,625,007, Ser. No. 14/457,592, titled MULTI-SPEED TRANSMISSION, filed Aug. 12, 2014, the entire disclosure of which is expressly incorporated by reference herein.

SUMMARY

The present disclosure provides systems and methods for coupling a multi-speed transmission to a prime mover. The systems and methods may provide for power extraction from the prime mover through control of an input clutch operatively coupling the multi-speed transmission to a prime mover.

In some instances throughout this disclosure and in the claims, numeric terminology, such as first, second, third, and fourth, is used in reference to various components, speed ratios, and other items. Such use is not intended to denote an ordering of the components. Rather, numeric terminology is used to assist the reader in identifying the component being referenced and should not be narrowly interpreted as providing a specific order of components.

In an exemplary embodiment of the present disclosure, a method for controlling a planetary transmission is provided. The planetary transmission having a plurality of planetary gearsets and a plurality of selective couplers. The planetary transmission being driven by a prime mover at an input of the planetary transmission and driving a driven component at an output of the planetary transmission. The plurality of selective couplers are selectively engaged in a plurality of combinations to establish a plurality of speed ratios between the input of the planetary transmission and the output of the planetary transmission. The method comprising the steps of: receiving a first characteristic indicative of an input speed of the input of the planetary transmission; receiving a second characteristic indicative of an output speed of the output of the planetary transmission; receiving a third characteristic indicative of an interconnector of the planetary transmission that may rotate independent of the input of the planetary transmission and may rotate independent of the output of the planetary transmission; and in response to a first shift event of the planetary transmission from a first combination of the plurality of combinations of the selective couplers corresponding to a first speed ratio of the plurality of speed ratios to a second combination of the plurality of combinations of the selective couplers corresponding to a second speed ratio of the plurality of speed ratios, determining for at least a subset of the plurality of selective couplers from the first shift event based on at least two of the received first characteristic, the received second characteristic, and the received third characteristic an estimated slip speed for each selective coupler in the at least the subset of the plurality of selective couplers.

In one example thereof, the step of determining the estimated slip speed is configured to occur in a shift window between a start of the shift event and a termination of the shift event, wherein the shift window includes a time period at least partially overlapping the first shift event.

In another example thereof, the step of determining the estimated slip speed is performed between a start of the shift event and a termination of the shift event at a frequency corresponding to a plurality of times every second.

In a further example thereof, the method further comprises determining a maximum estimated slip speed during the shift window.

In a still further example thereof, the method further comprises recording a maximum slip speed over the shift window.

In a yet further example thereof, a plurality of estimated slip speeds for a first subset of selective couplers during the first shift event is determined with less than each of the first characteristic, second characteristic, and third characteristic.

In a still yet further example thereof, a planetary transmission controller is configured to execute the method for controlling a planetary transmission provided hereinabove.

In a still further example thereof, the planetary transmission controller further comprising a first speed sensor configured to transmit the first characteristic indicative of an input speed; a second speed sensor configured to transmit the second characteristic indicative of an output speed; and a third speed sensor configured to transmit the third characteristic indicative of an interconnector speed.

In a yet further example thereof, wherein the third characteristic is indicative of a speed of an interconnector that fixedly couples a first gear component of a first planetary gearset of the plurality of planetary gearsets and a second gear component of a second planetary gearset of the plurality of planetary gearsets.

In another exemplary embodiment of the present disclosure, a method for controlling a planetary transmission is provided. The planetary transmission having a plurality of planetary gearsets and a plurality of selective couplers. The planetary transmission being driven by a prime mover at an input of the planetary transmission and driving a driven component at an output of the planetary transmission. The plurality of selective couplers are selectively engaged in a plurality of combinations to establish a plurality of speed ratios between the input of the planetary transmission and the output of the planetary transmission. The method comprising: receiving a first characteristic indicative of a first speed of a first component of the transmission; receiving a second characteristic indicative of a second speed of a second component of the transmission; across a plurality of shift events of the plurality of selective couplers, estimate a slip speed of at least a subset of the plurality of selective couplers based on the first characteristic and the second characteristic; and capturing a maximum slip speed for the subset of the plurality of selective couplers during a shift event of the plurality of shift events to monitor a health condition of the subset of selective couplers.

In one example thereof, the method further comprises: receiving a third characteristic indicative of a third speed of a third component of the transmission; and across the plurality of shift events of the plurality of selective couplers, estimating a slip speed of each of the plurality of selective couplers based on two of the first characteristic and the second characteristic and the third characteristic.

In another example thereof, the first characteristic is indicative of an input speed of the planetary transmission; wherein the second characteristic is indicative of an interconnector speed of the planetary transmission; and wherein the third characteristic is indicative of an output speed of the planetary transmission.

In yet another example thereof, the planetary transmission includes a first subset of the plurality of selective couplers, wherein the planetary transmission includes a second subset of the plurality of selective couplers, wherein slip speeds for each of the first subset of the plurality of selective couplers are estimated based on a first pairing of the first characteristic and the second characteristic and the third characteristic, and wherein slip speeds for each of the second subset of the plurality of selective couplers is based on a second pairing of the first characteristic and the second characteristic and the third characteristic, and wherein the first pairing is different than the second pairing.

In still another example thereof, the planetary transmission controller includes a calibration mode for each shift type and a normal mode for each shift type, where each shift type includes a change in state of the plurality of selective couplers from one of the plurality of speed ratios to another of the plurality of speed ratios, wherein in the calibration mode for each shift type the shift count increases by one for each shift event of the shift type, and wherein an average maximum slip speed for each selective coupler is determined for each shift event in the calibration mode.

In yet still another example thereof, in the normal mode for each shift type the shift count does not increase by one for each shift event of the shift type.

In still yet another example thereof, in the normal mode for each shift type, the planetary transmission controller is configured to adjust an average maximum slip speed for each selective coupler by a weight value of a current maximum slip speed.

In a still further example thereof, the planetary transmission controller is configured to compare a current maximum slip speed for at least one selective coupler of a first shift event to an all-time maximum slip speed for the at least one selective coupler of the first shift event, and if the current maximum slip speed for the at least one selective coupler of the first shift event exceeds the all-time maximum slip speed for the at least one selective couplers of the first shift event, update the all-time maximum slip speed for the at least one selective coupler of the first shift event to the current maximum slip speed of the at least one selective coupler of the first shift event.

In still yet another exemplary embodiment of the present disclosure, a planetary transmission is provided. The planetary transmission comprising: at least one stationary member; an input member rotatable relative to the at least one stationary member; a plurality of planetary gearsets operatively coupled to the input member, each of the plurality of planetary gearsets including a first gearset component, a second gearset component rotatable relative to the first gearset component, and a third gearset component rotatable relative to the second gearset component; an output member operatively coupled to the input member through the plurality of planetary gearsets and rotatable relative to the at least one stationary member; a plurality of selective couplers, wherein the plurality of selective couplers includes a first number of clutches and a second number of brakes, the plurality of selective couplers are selectively engaged in a plurality of combinations to establish a plurality of speed ratios between the input of the planetary transmission and the output of the planetary transmission; and a plurality of sensors including a first sensor of the plurality of sensors positioned to monitor a characteristic indicative of an input speed of the input member, a second sensor of the plurality of sensors positioned to monitor a characteristic indicative of an output speed of the output member, and a third sensor of the plurality of sensors positioned to monitor a characteristic indicative of a speed of an interconnector of the planetary transmission, the interconnector may rotate independent of the input member of the planetary transmission and may rotate independent of the output member of the planetary transmission.

In one example thereof, the plurality of planetary gearsets each include a first planetary gearset, a second planetary gearset, a third planetary gearset, and a fourth planetary gearset, and wherein the input member is fixedly coupled to the second gearset component of the first planetary gearset.

In another example thereof, the output member is fixedly coupled to the third gearset component of a planetary gearset of the plurality of planetary gearsets and to the second gearset component of another planetary gearset of the plurality of planetary gearsets.

In another example thereof, the plurality of planetary gearsets includes a first planetary gearset, a second planetary gearset, and a third planetary gearset, and wherein the interconnector fixedly couples at least a portion of the first planetary gearset, at least a portion of the second planetary gearset, and at least a portion of the third planetary gearset.

In yet another example thereof, the interconnector fixedly couples the third gear set component from the first planetary gearset, the first gear set from the second planetary gearset, and the first gear set from the third planetary gearset.

In still another example thereof, the plurality of selective couplers are selectively engaged in a plurality of combinations to establish at least eight forward speed ratios between the input member and the output member, each of the plurality of combinations having at least two of the plurality of selective couplers engaged.

In yet still another example thereof, the planetary transmission controller is configured to determine slip speed of each of the plurality of selective couplers based on data received from the plurality of sensors, and wherein a total number of the plurality of selective couplers is higher than a total number of the plurality of sensors.

In still yet another example thereof, the plurality of sensors are Hall effect sensors affixed to remain static relative to the at least one stationary member.

In a still further example thereof, the planetary transmission comprises a planetary transmission controller in data communication with each of the first sensor, the second sensor, and the third sensor.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein:

FIG. 2 is a truth table illustrating the selective engagement of the six selective couplers of FIG. 1 to provide eight forward gear or speed ratios of the multi-speed transmission of FIG. 1;

FIG. 4 depicts several tables of data determined by a planetary transmission controller based on a time history as shown, for example, in FIG. 3;

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION

Figure 1:
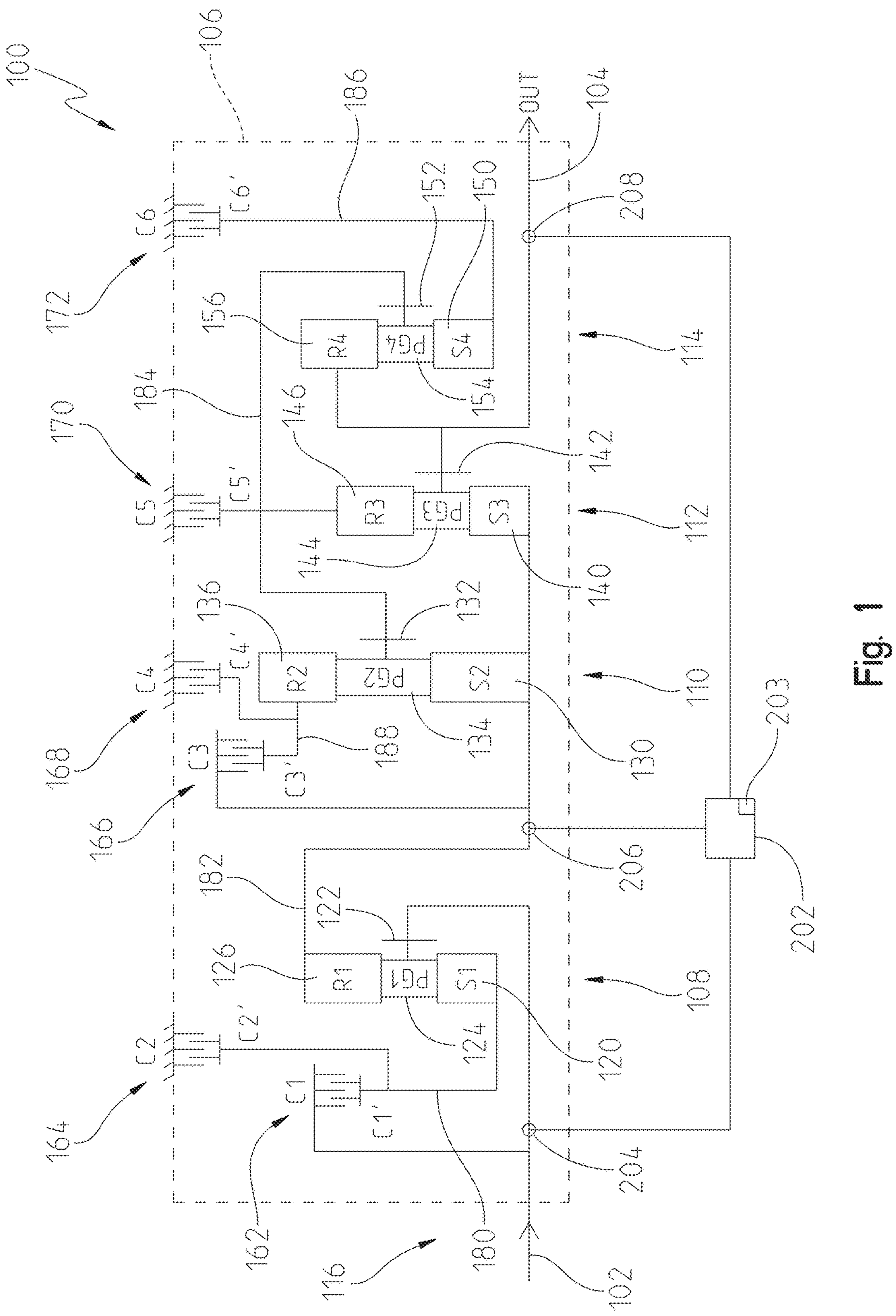
FIG. 1 is a diagrammatic view of an exemplary multi-speed transmission including four planetary gearsets and six selective couplers.

For the purposes of promoting an understanding of the principles of the present disclosure, reference is now made to the embodiment illustrated in the drawings, which is described below. The embodiment disclosed below is not intended to be exhaustive or limit the present disclosure to the precise form disclosed in the following detailed description. Rather, the embodiment is chosen and described so that others skilled in the art may utilize its teachings. Therefore, no limitation of the scope of the present disclosure is thereby intended. Corresponding reference characters indicate corresponding parts throughout the several views.

In the disclosed transmission embodiment, selective couplers are disclosed. A selective coupler is a device which may be actuated to fixedly couple two or more components together. A selective coupler fixedly couples two or more components to rotate together as a unit when the selective coupler is in an engaged configuration. Further, the two or more components may be rotatable relative to each other when the selective coupler is in a disengaged configuration. The terms “couples”, “coupled”, “coupler” and variations thereof are used to include both arrangements wherein the two or more components are in direct physical contact and arrangements wherein the two or more components are not in direct contact with each other (e.g., the components are “coupled” via at least a third component), but yet still cooperate or interact with each other.

A first exemplary selective coupler is a clutch. A clutch couples two or more rotating components to one another so that the two or more rotating components rotate together as a unit in an engaged configuration and permits relative rotation between the two or more rotating components in the disengaged position. Exemplary clutches may be shiftable friction-locked multi-disk clutches, shiftable form-locking claw or conical clutches, wet clutches, or any other known form of a clutch.

A second exemplary selective coupler is a brake. A brake couples one or more rotatable components to a stationary component to hold the one or more rotatable components stationary relative to the stationary component in the engaged configuration and permits rotation of the one or more components relative to the stationary component in the disengaged configuration. Exemplary brakes may be configured as shiftable-friction-locked disk brakes, shiftable friction-locked band brakes, shiftable form-locking claw or conical brakes, or any other known form of a brake.

Selective couplers may be actively controlled devices or passive devices. Exemplary actively controlled devices include hydraulically actuated clutch or brake elements and electrically actuated clutch or brake elements. Additional details regarding systems and methods for controlling selective couplers are disclosed in the above-incorporated U.S. Pat. No. 9,625,007.

In addition to coupling through selective couplers, various components of the disclosed transmission embodiments may be fixedly coupled together continuously throughout the operation of the disclosed transmissions. Components may be fixedly coupled together either permanently or removably. Components may be fixedly coupled together through spline connections, press fitting, fasteners, welding, machined or formed functional portions of a unitary piece, or other suitable methods of connecting components.

The disclosed transmission embodiments include a plurality of planetary gearsets. Each planetary gearset includes at least four components: a sun gear; a ring gear; a plurality of planet gears; and a carrier that is rotatably coupled to and carries the planet gears. In the case of a simple planetary gearset, the teeth of the sun gear are intermeshed with the teeth of the planet gears which are in turn intermeshed with the teeth of the ring gear. Each of these components may also be referred to as a gearset component. It will be apparent to one of skill in the art that some planetary gearsets may include further components than those explicitly identified. For example, one or more of the planetary gearsets may include two sets of planet gears. A first set of planet gears may intermesh with the sun gear while the second set of planet gears intermesh with the first set of planet gears and the ring gear. Both sets of planet gears are carried by the planet carrier.

One or more rotating components, such as shafts, drums, and other components, may be collectively referred to as an interconnector when the one or more components are fixedly coupled together. Interconnectors may further be fixedly coupled to one or more gearset components and/or one or more selective couplers.

An input member of the disclosed transmission embodiments is rotated by a prime mover. Exemplary prime movers include internal combustion engines, electric motors, hybrid power systems, and other suitable power systems. In one embodiment, the prime mover indirectly rotates the input member through a clutch and/or a torque converter. An output member of the disclosed transmission embodiments provides rotational power to one or more working components. Exemplary working components include one or more drive wheels of a motor vehicle, a power take-off shaft, a pump, and other suitable devices. The output member is rotated based on the interconnections of the gearset components and the selective couplers of the transmission. By changing the interconnections of the gearset components and the selective couplers, a rotation speed of the output member may be varied from a rotation speed of the input member.

The disclosed transmission embodiment is capable of transferring torque from the input member to the output member and rotating the output member in at least eight forward gear or speed ratios relative to the input member, illustratively eight forward gear or speed ratios. The architecture disclosed herein may be utilized to achieve various gear ratios based on the characteristics of the gearsets utilized. Exemplary characteristics include respective gear diameters, the number of gear teeth, and the configurations of the various gears.

FIG. 1 is a diagrammatic representation of a multi-speed transmission 100. Multi-speed transmission 100 includes an input member 102 (sometimes referred to as an input to the multi-speed transmission 100) and an output member 104 (sometimes referred to as an output to the multi-speed transmission 100). Each of input member 102 and output member 104 is rotatable relative to at least one stationary member 106. An exemplary input member 102 is an input shaft or other suitable rotatable component. An exemplary output member 104 is an output shaft or other suitable rotatable component. An exemplary stationary member 106 is a housing of multi-speed transmission 100. The housing may include several components coupled together.

Multi-speed transmission 100 includes a plurality of planetary gearsets, illustratively a first planetary gearset 108, a second planetary gearset 110, a third planetary gearset 112, and a fourth planetary gearset 114. In one embodiment, additional planetary gearsets may be included. Further, although first planetary gearset 108, second planetary gearset 110, third planetary gearset 112, and fourth planetary gearset 114 are illustrated as simple planetary gearsets, it is contemplated that compound planetary gearsets may be included in some embodiments.

In one embodiment, multi-speed transmission 100 is arranged as illustrated in FIG. 1, with first planetary gearset 108 positioned between a first location or end 116 at which input member 102 enters stationary member 106 and second planetary gearset 110, second planetary gearset 110 is positioned between first planetary gearset 108 and third planetary gearset 112, third planetary gearset 112 is positioned between second planetary gearset 110 and fourth planetary gearset 114, and fourth planetary gearset 114 is positioned between third planetary gearset 112 and a second location or end 118 at which output member 104 exits stationary member 106. In alternative embodiments, first planetary gearset 108, second planetary gearset 110, third planetary gearset 112, and fourth planetary gearset 114 are arranged in any order relative to location 116 and location 118. In embodiments, each of first planetary gearset 108, second planetary gearset 110, third planetary gearset 112, and fourth planetary gearset 114 are axially aligned. In one example, input member 102 and output member 104 are also axially aligned with first planetary gearset 108, second planetary gearset 110, third planetary gearset 112, and fourth planetary gearset 114. In alternative embodiments, one or more of input member 102, output member 104, first planetary gearset 108, second planetary gearset 110, third planetary gearset 112, and fourth planetary gearset 114 are offset and not axially aligned with the remainder.

First planetary gearset 108 includes a sun gear 120, a planet carrier 122 supporting a plurality of planet gears 124, and a ring gear 126. Second planetary gearset 110 includes a sun gear 130, a planet carrier 132 supporting a plurality of planet gears 134, and a ring gear 136. Third planetary gearset 112 includes a sun gear 140, a planet carrier 142 supporting a plurality of planet gears 144, and a ring gear 146. Fourth planetary gearset 114 includes a sun gear 150, a planet carrier 152 supporting a plurality of planet gears 154, and a ring gear 156.

Multi-speed transmission 100 further includes a plurality of selective couplers, illustratively a first selective coupler 162, a second selective coupler 164, a third selective coupler 166, a fourth selective coupler 168, a fifth selective coupler 170, and a sixth selective coupler 172. In the illustrated embodiment, first selective coupler 162 and third selective coupler 166 are clutches and second selective coupler 164, fourth selective coupler 168, fifth selective coupler 170, and sixth selective coupler 172 are brakes. The axial locations of the clutches and brakes relative to the plurality of planetary gearsets may be altered from the illustrated axial locations.

Multi-speed transmission 100 includes several components that are illustratively shown as being fixedly coupled together. Input member 102 is fixedly coupled to planet carrier 122 of first planetary gearset 108 and first selective coupler 162. Output member 104 is fixedly coupled to planet carrier 142 of third planetary gearset 112 and ring gear 156 of fourth planetary gearset 114. Sun gear 120 of first planetary gearset 108 is fixedly coupled to first selective coupler 162 and second selective coupler 164. Ring gear 126 of first planetary gearset 108 is fixedly coupled to third selective coupler 166, sun gear 130 of second planetary gearset 110, and sun gear 140 of third planetary gearset 112. Planet carrier 132 of second planetary gearset 110 is fixedly coupled to ring gear 146 of third planetary gearset 112, planet carrier 152 of fourth planetary gearset 114, and fifth selective coupler 170. Ring gear 136 of second planetary gearset 110 is fixedly coupled to third selective coupler 166 and fourth selective coupler 168. Sun gear 150 of fourth planetary gearset 114 is fixedly coupled to sixth selective coupler 172. In alternative embodiments, one or more of the components fixedly coupled together are selectively coupled together through one or more selective couplers.

Multi-speed transmission 100 may be described as having seven interconnectors. Input member 102 is a first interconnector that both provides input torque to multi-speed transmission 100 and fixedly couples planet carrier 122 of first planetary gearset 108 to first selective coupler 162. Output member 104 is a second interconnector that both provides output torque from multi-speed transmission 100 and fixedly couples ring gear 156 of fourth planetary gearset 114 to planet carrier 142 of third planetary gearset 112. A third interconnector 180 fixedly couples sun gear 120 of first planetary gearset 108, first selective coupler 162, and second selective coupler 164 together. A fourth interconnector 182 fixedly couples ring gear 126 of first planetary gearset 108, sun gear 130 of second planetary gearset 110, sun gear 140 of third planetary gearset 112, and third selective coupler 166 together. A fifth interconnector 184 fixedly couples planet carrier 132 of second planetary gearset 110, ring gear 146 of third planetary gearset 112, planet carrier 152 of fourth planetary gearset 114, and fifth selective coupler 170 together. A sixth interconnector 186 fixedly couples sun gear 150 of fourth planetary gearset 114 and sixth selective coupler 172 together. A seventh interconnector 188 fixedly couples ring gear 136 of second planetary gearset 110, third selective coupler 166, and fourth selective coupler 168 together.

Multi-speed transmission 100 further includes several components that are illustratively shown as being selectively coupled together through selective couplers. First selective coupler 162, when engaged, fixedly couples planet carrier 122 of first planetary gearset 108 and input member 102 to second selective coupler 164 and sun gear 120 of first planetary gearset 108. When first selective coupler 162 is engaged, sun gear 120 and planet carrier 122 of first planetary gearset 108 are locked together. Therefore, sun gear 120, planet carrier 122, and ring gear 126 of first planetary gearset 108 all rotate together as a single unit. The same effect may be realized by coupling any two of sun gear 120, planet carrier 122, and ring gear 126 of first planetary gearset 108 together. When first selective coupler 162 is disengaged, input member 102 and planet carrier 122 of first planetary gearset 108 may rotate relative to third selective coupler 166 and sun gear 120 of first planetary gearset 108.

Second selective coupler 164, when engaged, fixedly couples first selective coupler 162 and sun gear 120 of first planetary gearset 108 to stationary member 106. When second selective coupler 164 is disengaged, first selective coupler 162 and sun gear 120 of first planetary gearset 108 may rotate relative to stationary member 106.

Third selective coupler 166, when engaged, fixedly couples ring gear 126 of first planetary gearset 108, sun gear 130 of second planetary gearset 110, and sun gear 140 of third planetary gearset 112 to ring gear 136 of second planetary gearset 110. When third selective coupler 166 is engaged, sun gear 130 and ring gear 136 of second planetary gearset 110 are locked together. Therefore, sun gear 130, planet carrier 132, and ring gear 136 of second planetary gearset 110 all rotate together as a single unit. The same effect may be realized by coupling any two of sun gear 130, planet carrier 132, and ring gear 136 of second planetary gearset 110 together. When third selective coupler 166 is disengaged, ring gear 126 of first planetary gearset 108, sun gear 130 of second planetary gearset 110, and sun gear 140 of third planetary gearset 112 may rotate relative to ring gear 136 of second planetary gearset 110.

Fourth selective coupler 168, when engaged, fixedly couples ring gear 136 of second planetary gearset 110 to at least one stationary member 106. When fourth selective coupler 168 is disengaged, ring gear 136 of second planetary gearset 110 may rotate relative to at least one stationary member 106.

Fifth selective coupler 170, when engaged, fixedly couples planet carrier 132 of second planetary gearset 110, ring gear 146 of third planetary gearset 112, and planet carrier 152 of fourth planetary gearset 114 to at least one stationary member 106. When fifth selective coupler 170 is disengaged, planet carrier 132 of second planetary gearset 110, ring gear 146 of third planetary gearset 112, and planet carrier 152 of fourth planetary gearset 114 may rotate relative to at least one stationary member 106.

Sixth selective coupler 172, when engaged, fixedly couples sun gear 150 of fourth planetary gearset 114 to at least one stationary member 106. When sixth selective coupler 172 is disengaged, sun gear 150 of fourth planetary gearset 114 may rotate relative to at least one stationary member 106.

By engaging various combinations of first selective coupler 162, second selective coupler 164, third selective coupler 166, fourth selective coupler 168, fifth selective coupler 170, and sixth selective coupler 172, additional components of multi-speed transmission 100 may be fixedly coupled together.

The plurality of planetary gearsets and the plurality of selective couplers of multi-speed transmission 100 may be interconnected in various arrangements to provide torque from input member 102 to output member 104 in at least eight forward gear or speed ratios. Referring to FIG. 2, an exemplary truth table 200 is shown that provides the state of each of first selective coupler 162, second selective coupler 164, third selective coupler 166, fourth selective coupler 168, fifth selective coupler 170, and sixth selective coupler 172 for eight different forward gear or speed ratios. Each row corresponds to a given interconnection arrangement for transmission 100. The first column provides the gear range ($1^{st}$-$8^{th}$ forward gears). The remaining columns illustrate which ones of the selective couplers 162-172 are engaged ("X" indicates engaged) and which ones of selective couplers 162-172 are disengaged ("(blank)" indicates disengaged). FIG. 2 is only one example of any number of truth tables possible for achieving at least eight forward ratios. Although not provided in truth table 200, various reverse gear ratios are also possible with multi-speed transmission 100.

In the example of FIG. 2, to place multi-speed transmission 100 in neutral (N), all of first selective coupler 162, second selective coupler 164, third selective coupler 166, fourth selective coupler 168, fifth selective coupler 170, and sixth selective coupler 172 are in the disengaged configuration. One or more of first selective coupler 162, second selective coupler 164, third selective coupler 166, fourth selective coupler 168, fifth selective coupler 170, and sixth selective coupler 172 may remain engaged in neutral (Neu) as long as the combination of first selective coupler 162, second selective coupler 164, third selective coupler 166, fourth selective coupler 168, fifth selective coupler 170, and sixth selective coupler 172 does not transmit torque from input member 102 to output member 104.

A first forward ratio (shown as 1st) in truth table 200 of FIG. 2 is achieved by having second selective coupler 164 and fifth selective coupler 170 in an engaged configuration and first selective coupler 162, third selective coupler 166, fourth selective coupler 168, and sixth selective coupler 172 in a disengaged configuration.

A second or subsequent forward ratio (shown as 2nd) in truth table 200 of FIG. 2 is achieved by having first selective coupler 162 and fifth selective coupler 170 in an engaged configuration and second selective coupler 164, third selective coupler 166, fourth selective coupler 168, and sixth selective coupler 172 in a disengaged configuration. Therefore, when transitioning between the first forward ratio and the second forward ratio, second selective coupler 164 is placed in the disengaged configuration and first selective coupler 162 is placed in the engaged configuration.

A third or subsequent forward ratio (shown as 3rd) in truth table 200 of FIG. 2 is achieved by having second selective coupler 164 and fourth selective coupler 168 in an engaged configuration and first selective coupler 162, third selective coupler 166, fifth selective coupler 170, and sixth selective coupler 172 in a disengaged configuration. Therefore, when transitioning between the second forward ratio and the third forward ratio, both first selective coupler 162 and fifth selective coupler 170 placed in the disengaged configuration and both second selective coupler 164 and fourth selective coupler 168 are placed in the engaged configuration. In the exemplary embodiment shown, placing both first selective coupler 162 and fifth selective coupler 170 in the disengaged configuration and both second selective coupler 164 and fourth selective coupler 168 in the engaged configuration occurs simultaneously. It is contemplated, however, that this transition may be staged or occur sequentially.

A fourth or subsequent forward ratio (shown as 4th) in truth table 200 of FIG. 2 is achieved by having second selective coupler 164 and sixth selective coupler 172 in an engaged configuration and first selective coupler 162, third selective coupler 166, fourth selective coupler 168, and fifth selective coupler 170 in a disengaged configuration. Therefore, when transitioning between the third forward ratio and the fourth forward ratio, fourth selective coupler 168 is placed in the disengaged configuration and sixth selective coupler 172 is placed in the engaged configuration.

A fifth or subsequent forward ratio (shown as 5th) in truth table 200 of FIG. 2 is achieved by having first selective coupler 162 and fourth selective coupler 168 in an engaged configuration and second selective coupler 164, third selective coupler 166, fifth selective coupler 170, and sixth selective coupler 172 in a disengaged configuration. Therefore, when transitioning between the fourth forward ratio and the fifth forward ratio, both second selective coupler 164 and sixth selective coupler 172 are placed in the disengaged configuration and both first selective coupler 162 and fourth selective coupler 168 are placed in the engaged configuration. In the exemplary embodiment shown, placing both second selective coupler 164 and sixth selective coupler 172 in the disengaged configuration and both first selective coupler 162 and fourth selective coupler 168 in the engaged configuration occurs simultaneously. It is contemplated, however, that this transition may be staged or occur sequentially.

A sixth or subsequent forward ratio (shown as 6th) in truth table 200 of FIG. 2 is achieved by having first selective coupler 162 and sixth selective coupler 172 in an engaged configuration and second selective coupler 164, third selective coupler 166, fourth selective coupler 168, and fifth selective coupler 170 in a disengaged configuration. Therefore, when transitioning between the fifth forward ratio and the sixth forward ratio, fourth selective coupler 168 is placed in the disengaged configuration and sixth selective coupler 172 is placed in the engaged configuration.

A seventh or subsequent forward ratio (shown as 7th) in truth table 200 of FIG. 2 is achieved by having second selective coupler 164 and third selective coupler 166 in an engaged configuration and first selective coupler 162, fourth selective coupler 168, fifth selective coupler 170, and sixth selective coupler 172 in a disengaged configuration. Therefore, when transitioning between the sixth forward ratio and the seventh forward ratio, both first selective coupler 162 and sixth selective coupler 172 are placed in the disengaged configuration and both second selective coupler 164 and third selective coupler 166 are placed in the engaged configuration. In the exemplary embodiment shown, placing both first selective coupler 162 and sixth selective coupler 172 in the disengaged configuration and both second selective coupler 164 and third selective coupler 166 in the engaged configuration occurs simultaneously. It is contemplated, however, that this transition may be staged or occur sequentially.

An eighth or subsequent forward ratio (shown as 8th) in truth table 200 of FIG. 2 is achieved by having first selective coupler 162 and third selective coupler 166 in an engaged configuration and second selective coupler 164, fourth selective coupler 168, fifth selective coupler 170, and sixth selective coupler 172 in a disengaged configuration. Therefore, when transitioning between the seventh forward ratio and the eighth forward ratio, second selective coupler 164 is placed in the disengaged configuration and first selective coupler 162 is placed in the engaged configuration.

The present disclosure contemplates that downshifts follow the reverse sequence of the corresponding upshift (as described above). Further, several power-on skip-shifts that are single-transition are possible (e.g., from $1^{st}$ up to $3^{rd}$, from $3^{rd}$ down to $1^{st}$, from $4^{th}$ up to $6^{th}$, and from $6^{th}$ down to $4^{th}$).

Returning to FIG. 1, the multi-speed transmission 100 may be coupled with a transmission control module 202 useful to monitor operation of the multi-speed transmission 100. For example, transmission control module 202 may be used to monitor health of individual components of multi-speed transmission 100 including the heath state of a component (e.g., whether the component is experiencing a fault) as well as a trend in the health of a component (e.g., comparing a change over time of data indicating a change in performance of a component), either or both of which may be referred to herein as a health condition. As described above, multi-speed transmission 100 includes several different planetary gear sets (e.g., first planetary gearset 108, second planetary gearset 110, third planetary gearset 112, and fourth planetary gearset 114) each of which include sun gears, ring gear, planet carrier, and planet gears. Multi-speed transmission further comprises additional components such as selective couplers (e.g., first selective coupler 162, second selective coupler 164, third selective coupler 166, fourth selective coupler 168, fifth selective coupler 170, and sixth selective coupler 172) which may be used to couple at least portions of one planetary gear set with at least portions of another planetary gear set. The selective couplers are used to transition the coupling between portions of the planetary gearsets and are known to be wear devices that require replacement in whole and/or refurbishment typically after a long period of use of multi-speed transmission 100.

It is known that an individual planetary gear set, such as any one of first planetary gearset 108, second planetary gearset 110, third planetary gearset 112, and fourth planetary gearset 114, has a related mathematical equation dubbed the Willis equation that relates speed and diameter of the sun gear, ring gear, planet carrier, and planet gears. The equation governs a relationship of movement of the components of a single planetary gear set. As set forth above in the truth table of FIG. 2 and the accompanying description of FIGS. 1 and 2, engagement and disengagement of the selective couplers (e.g., first selective coupler 162, second selective coupler 164, third selective coupler 166, fourth selective coupler 168, fifth selective coupler 170, and sixth selective coupler 172) results in a long chain of coupled sun gears, ring gear, planet carrier, and planet gears that span across multiple planetary gear sets (e.g., first planetary gearset 108, second planetary gearset 110, third planetary gearset 112, and fourth planetary gearset 114). Though coupling different planetary gear sets through several selective couplers results in large number of combinations of sun gears, ring gear, planet carrier, and planet gears that span across multiple planetary gear sets, it has been unexpectedly discovered that mathematical equations may be used to relate speed of select components of multi-speed transmission 100 to speed of other select components of multi-speed transmission 100. Extending the relationship beyond the components of the planetary gear set, it has been further discovered that a differential speed ("slip speed") of any given selective coupler (e.g., first selective coupler 162, second selective coupler 164, third selective coupler 166, fourth selective coupler 168, fifth selective coupler 170, and sixth selective coupler 172) may also be determined. Still further, it has been discovered that slip speed of any given selective coupler (e.g., first selective coupler 162, second selective coupler 164, third selective coupler 166, fourth selective coupler 168, fifth selective coupler 170, and sixth selective coupler 172) may be determined using speed sensing of just three separate components across the planetary gear sets regardless of the wide variety of combinations of sun gears, ring gears, planet carriers, and planet gears and selective couplers that make up any given gear ratio of multi-speed transmission 100. In some cases, slip speed of any given selective coupler (e.g., first selective coupler 162, second selective coupler 164, third selective coupler 166, fourth selective coupler 168, fifth selective coupler 170, and sixth selective coupler 172) may be determined on the basis of speed of only two components.

Transmission control module 202 may be used to control and/or monitor operation of any of first selective coupler 162, second selective coupler 164, third selective coupler 166, fourth selective coupler 168, fifth selective coupler 170, and sixth selective coupler 172 on the basis of sensed speed of a few select components of the multi-speed transmission 100, such as input member 102, output member 104, various components of one or more of first planetary gearset 108, second planetary gearset 110, third planetary gearset 112, and fourth planetary gearset 114, and one or more interconnectors 182, 184, 186, and 188. In embodiments, transmission control module 202 includes a planetary transmission controller 203 that may be used to monitor the health and/or health state of one or more of first selective coupler 162, second selective coupler 164, third selective coupler 166, fourth selective coupler 168, fifth selective coupler 170, and sixth selective coupler 172 by sensing speeds representative of a few select components of the multi-speed transmission 100, such as input member 102, output member 104, various components of one or more of first planetary gearset 108, second planetary gearset 110, third planetary gearset 112, and fourth planetary gearset 114, and one or more interconnectors 182, 184, 186, and 188. In embodiments, transmission control module 202 may be coupled with speed sensors useful to sense speed of an input to multi-speed transmission 100, an output from multi-speed transmission 100, and an intermediate portion of multi-speed transmission 100. Upon receipt of information from the speed sensors, planetary transmission controller 203 may evaluate the health condition of multi-speed transmission 100.

It will be appreciated that planetary transmission controller 203 may be embedded in transmission control module 202, or may be standalone. For example, planetary transmission controller 203 may be resident on a computing device that is remote from transmission control module 202. In embodiments, therefore, planetary transmission controller 203 may be located in a cloud-based service that receives data from multi-speed transmission 100. In further embodiments, planetary transmission controller 203 may receive data from transmission control module 202 of multi-speed transmission 100, where transmission control module 202 may serve as a data hub for transmission onto planetary transmission controller 203. For example, transmission control module 202 may transmit data collected from speed sensors for further evaluate by planetary transmission controller 203 in a remote computing environment (e.g., a service center, cloud computing environment, manufacturing facility, etc.). Transmission of data collected from speed sensors may be in real time or may be archived local to transmission control module 202 for transmission to a remote computing environment at a later time. Furthermore, data transmitted to planetary transmission controller 203 from speed sensors may be raw and/or calculated data. Data provided by transmission control module 202 may include raw data and/or calculated data (e.g., raw data from sensors supplied to a remote planetary transmission controller 203 for health condition monitoring; calculated health condition data determined by planetary transmission controller 203 resident with transmission control module 202). Whether planetary transmission controller 203 is resident with transmission control module 202 or remote, health condition data may be provided by planetary transmission controller 203 automatically (e.g., regularly scheduled transmissions) or may be on-demand (e.g., a service technician triggers transmission control module 202 to download a data set related to health condition of multi-speed transmission 100). In short, health condition may be monitored by planetary transmission controller 203 that is resident with transmission control module 202, or may be monitored at a remote location by planetary transmission controller 203 that is located in a computing device physically separate from transmission control module 202.

To determine slip speed of any one or more of first selective coupler 162, second selective coupler 164, third selective coupler 166, fourth selective coupler 168, fifth selective coupler 170, and sixth selective coupler 17, planetary transmission controller 203 may be in data communication with a first sensor 204, a second sensor 206, and a third sensor 208 configured to sense speed of one or more components of multi-speed transmission 100. The data communication may be via transmission control module 202. In embodiments, the data communication between first sensor 204, second sensor 206, and third sensor 208 may be direct to planetary transmission controller 203. For example, planetary transmission controller 203 may be physically separate from transmission control module 202 but in data communication with transmission control module 202, such as may be the case where wireless transmission of data from the speed sensors are provided to a remote planetary transmission controller 203 via transmission control module 202. Reference below may be made to planetary transmission controller 203 embedded in transmission control module 202 for ease of convenience, but no limitation is hereby intended.

First sensor 204 is configured to sense a first characteristic indicative of an input speed of input member 102 to the multi-speed transmission 100. As discussed above, in one embodiment, the prime mover indirectly rotates the input member through a clutch and/or a torque converter. First sensor 204, therefore, in embodiments, may be used to sense the first characteristic indicative of input speed of either the turbine to a torque converter, the input member 102 itself, or a countershaft geared with input member 102 whereby a speed of input member 102 may be determined based on a speed of the countershaft.

First sensor 204 may take any form suitable to sense the first characteristic indicative of input speed of the input member 102. For example, in embodiments, first sensor 204 may be a Hall effect sensor configured to measure a passing ferromagnetic portion(s) of the input member 102. First sensor 204 may be configured to output a signal that includes the first characteristic indicative of input speed. The signal output from first sensor 204 may be digital or analog, and may be transmitted to planetary transmission controller 203 at any variety of data transmission speeds. In one form the signal output from first sensor 204 is conveyed to planetary transmission controller 203 through wired connection. In other embodiments, the signal output from first sensor 204 is conveyed to planetary transmission controller 203 through wireless transmission. Planetary transmission controller 203, therefore, is in data communication with first sensor 204. Speed may be determined by planetary transmission controller 203 either through extraction of a speed value from the first characteristic (e.g., a magnitude of the signal directly relates to speed; a numerical value of speed is digitally transmitted as a data packet from first sensor 204 to planetary transmission controller 203), may be determined through calculation (e.g., the signal received from first sensor 204 may be converted to a value of speed through a calibration table such as based on the frequency of the detection of the ferromagnetic portion(s)), etc.

Second sensor 206 is configured to sense a second characteristic indicative of speed of an intermediate component in multi-speed transmission 100 between input member 102 and output member 104 of multi-speed transmission 100. In embodiments, intermediate component sensed by second sensor 206 is an interconnector of multi-speed transmission 100, or a countershaft geared to the interconnector whereby a speed of the interconnector may be determined based on a speed of the countershaft. In the illustrated embodiment, second sensor 206 is configured to sense a second characteristic indicative of speed of fourth interconnector 182 of the multi-speed transmission 100.

Second sensor 206 may take any form suitable to sense the second characteristic indicative of speed of fourth interconnector 182. For example, in embodiments, second sensor 206 may be a Hall effect sensor configured to measure a passing ferromagnetic portion(s) of fourth interconnector 182. Second sensor 206 may be configured to output a signal that includes the second characteristic indicative of speed of fourth interconnector 182. The signal output from second sensor 206 may be digital or analog, and may be transmitted to planetary transmission controller 203 at any variety of data transmission speeds. In one form the signal output from second sensor 206 is conveyed to planetary transmission controller 203 through wired connection. In other embodiments, the signal output from second sensor 206 is conveyed to planetary transmission controller 203 through wireless transmission. Planetary transmission controller 203, therefore, is in data communication with second sensor 206. Speed may be determined by the planetary transmission controller 203 either through extraction of a speed value from the second characteristic (e.g., a magnitude of the signal directly relates to speed; a numerical value of speed is digitally transmitted as a data packet from second sensor 206 to planetary transmission controller 203), may be determined through calculation (e.g., the signal received from second sensor 206 may be converted to a value of speed through a calibration table such as based on the frequency of the detection of the ferromagnetic portion(s)), etc.

Third sensor 208 is configured to sense a third characteristic indicative of speed of output member 104 of multi-speed transmission 100. In the illustrated embodiment, third sensor 208 is configured to sense a third characteristic indicative of speed of sixth interconnector 186 of the multi-speed transmission 100 which rotates at the same speed as output member 104.

Third sensor 208 may take any form suitable to sense the third characteristic indicative of speed of sixth interconnector 186, or a countershaft geared to the interconnector 186 whereby a speed of the interconnector may be determined based on a speed of the countershaft. For example, in embodiments, third sensor 208 may be a Hall effect sensor configured to measure a passing ferromagnetic portion(s) of sixth interconnector 186. Third sensor 208 may be configured to output a signal that includes the third characteristic indicative of speed of sixth interconnector 186. The signal output from third sensor 208 may be digital or analog, and may be transmitted to planetary transmission controller 203 at any variety of data transmission speeds. In one form the signal output from third sensor 208 is conveyed to planetary transmission controller 203 through wired connection. In other embodiments, the signal output from third sensor 208 is conveyed to planetary transmission controller 203 through wireless transmission. Planetary transmission controller 203, therefore, is in data communication with third sensor 208. Speed may be determined by the planetary transmission controller 203 either through extraction of a speed value from the third characteristic (e.g., a magnitude of the signal directly relates to speed; a numerical value of speed is digitally transmitted as a data packet from third sensor 208 to planetary transmission controller 203), may be determined through calculation (e.g., the signal received from third sensor 208 may be converted to a value of speed through a calibration table such as based on the frequency of the detection of the ferromagnetic portion(s)), etc.

Upon receipt of first characteristic indicative of a speed of input member 102 of multi-speed transmission 100, second characteristic indicative of a speed of an intermediate component of multi-speed transmission 100, and third characteristic indicative of a speed of the output of multi-speed transmission 100, planetary transmission controller 203 is configured to determine slip speeds of first selective coupler 162, second selective coupler 164, third selective coupler 166, fourth selective coupler 168, fifth selective coupler 170, and sixth selective coupler 172. In embodiments, speeds of each of the components may be determined from the first characteristic, second characteristic, and third characteristic. Table 1 below provides equations useful to determine slip speeds of the various selective couplers based on two or more of the sensed speeds of select rotating components of the illustrated embodiments of multi-speed transmission 100 shown in FIG. 1 provided by first sensor 204, second sensor 206, and/or third sensor 208.

$$C1Slip = C2Slip - Nin \quad \text{(Eq. 1)}$$

$$C2Slip = a * Nhigh - b * Nin \quad \text{(Eq. 2)}$$

$$C3Slip = C4Slip - Nhigh \quad \text{(Eq. 3)}$$

$$C4Slip = c * C5Slip - d * Nhigh \quad \text{(Eq. 4)}$$

$$C5Slip = e * Nout - f * Nhigh \quad \text{(Eq. 5)}$$

$$C6Slip = g * C5Slip - h * Nout \quad \text{(Eq. 6)}$$

In the equations above, C1Slip is the differential speed (slip speed) of first selective coupler 162; C2Slip is the differential speed (slip speed) of second selective coupler 164; C3Slip is the differential speed (slip speed) of third selective coupler 166; C4Slip is the differential speed (slip speed) of fourth selective coupler 168; C5Slip is the differential speed (slip speed) of fifth selective coupler 170; C6Slip is the differential speed (slip speed) of sixth selective coupler 172. Nin is the speed of input member 102; Nhigh is the speed of fourth interconnector 182 between input member 102 and output member 104; and Nout is the speed of output member 104. In embodiments, Nhigh is the speed of fourth interconnector 182. The coefficients a-h of equations 1-6 are based on the characteristics of the planetary components, such as diameters and number of gear teeth. In embodiments, the coefficients for equations are as follows: a=1.36; b=2.75; c=1.41; d=0.41; e=1.39; f=0.39; g=3.35; h=2.35.

As will therefore be appreciated, any given slip speed may be determined by subtracting one speed (or a proportion of one speed determined by multiplying the speed by a coefficient) from another speed (or a proportion of another speed determined by multiplying the another speed by a coefficient). Stated differently, any given slip speed may be determined by summing a first speed (or a proportion of one speed determined by multiplying the speed by a coefficient) from another speed (or a proportion of another speed determined by multiplying the another speed by a coefficient), where the coefficient for one or both speeds may be negative. In some cases, one or more of the coefficients may be one (e.g., though Eq. 1 does not list a coefficient for either the first term or the second term, a generic form of Eq. 1 would include a first coefficient multiplied by C2Slip and a second coefficient multiplied by Nin, where each of the first coefficient and second coefficient are 1. From the equations presented above, it is also possible to determine slip speeds for a first grouping of selective couplers based on only two speeds, while slip speeds for a different grouping of selective couplers may be determined on the basis of three speeds. For example, Eq. 1 and Eq. 2 may be used to determine slip speed for first selective coupler 162 and second selective coupler 164 on the basis of Nin and Nhigh. Eq. 1 and Eq. 2 and Eq. 5 may be used to determine slip speed for first selective coupler 162 and second selective coupler 164 and fifth selective coupler 170 on the basis of Nin and Nhigh and Nout.

The equations presented above to determine slip speed for each of the selective couplers (e.g., first selective coupler 162, second selective coupler 164, third selective coupler 166, fourth selective coupler 168, fifth selective coupler 170, and sixth selective coupler 172) apply to the respective selective coupler whether the selective coupler is engaged or disengaged. Thus, the equations above are universal equations that apply during the entirety of operation of the multi-speed transmission 100 such that at any given moment in time, planetary transmission controller 203 may determine slip speed for any of the selective couplers through use of the equations above. For example, and with particular reference to FIG. 2, planetary transmission controller 203 may determine slip speed for first selective coupler 162, second selective coupler 164, and fifth selective coupler 170 during the shift event from 1$^{st}$ gear to 2$^{nd}$ gear. Planetary transmission controller 203 may be configured to monitor each slip speed continuously, such as at fixed intervals, using the equations above, or may be configured to monitor slip speeds of all selective couplers during a time duration of a shift event, or may be configured to monitor slip speeds of only select selective couplers involved in a particular shift event during the shift event. Determining slip speeds during a shift event of relevant selective couplers provides an opportunity to monitor the relevant selective couplers for a health status and/or a health condition.

Figure 3:
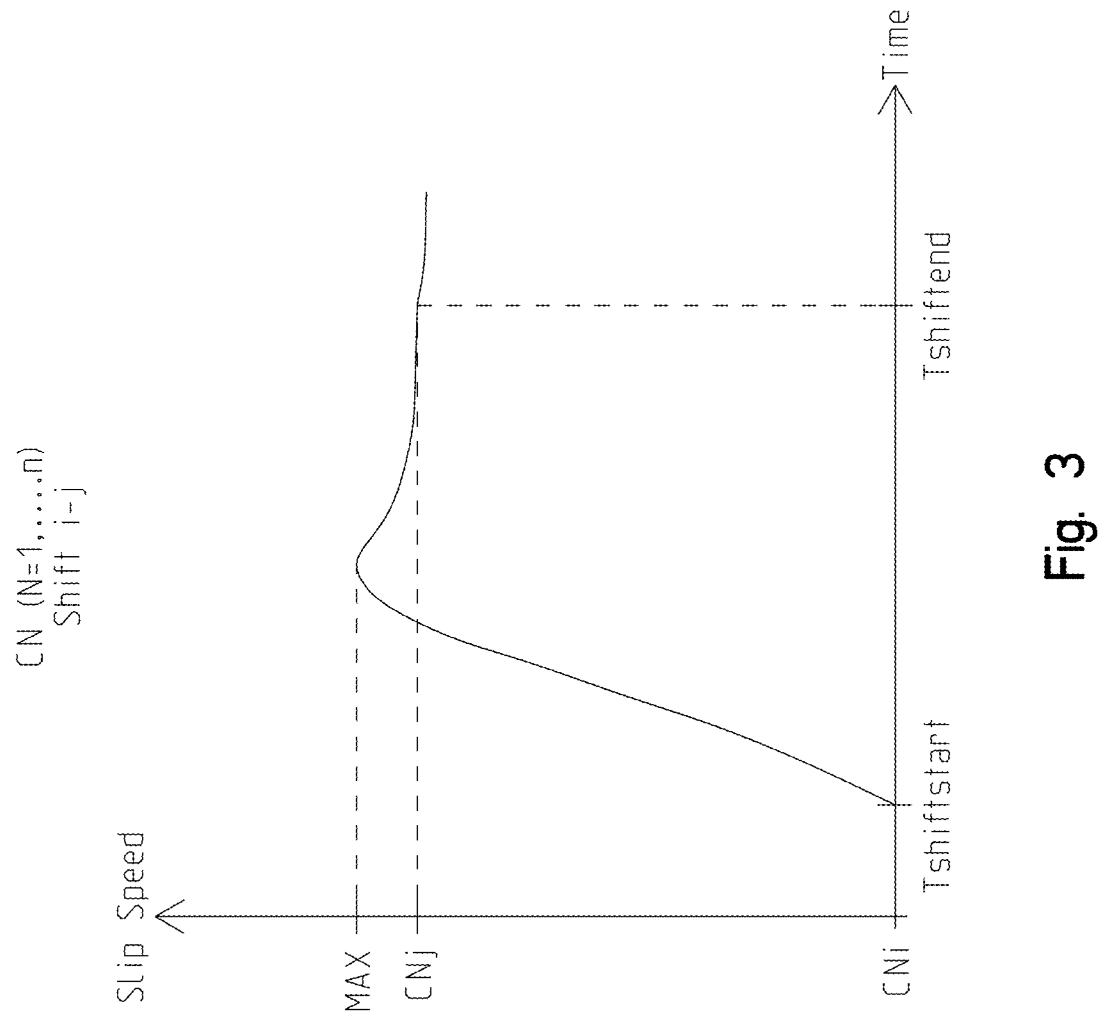
FIG. 3 is an exemplary time history of slip speed of a selective coupler of a multi-speed transmission as the selective couple transitions between an engaged and disengaged condition.

Turning now to FIG. 3, an example time history is illustrated tracing a slip speed of a selective coupler (e.g., any of first selective coupler 162, second selective coupler 164, third selective coupler 166, fourth selective coupler 168, fifth selective coupler 170, or sixth selective coupler 172) denoted as CN, where N=1, . . . , n, with n equal to the number of selective couplers in multi-speed transmission 100. The time history represents the slip speed (y-axis) of the Nth selective coupler (CN) plotted against time (x-axis) for a shift event from a first gear "i" to a second gear "j" (e.g., shifting from a first gear in the first column of FIG. 2 to a second gear in the first column of FIG. 2). The designator "i" and "j" are different from each other and are typically adjacent to one another (e.g., "i" is 1 and "j" is 2 (representing an upshift); "i" is 5 and "j" is 4 (representing a downshift)). The range of "i" and "j" depend on the total number of gears available in any given multi-speed transmission 100, and will also include a neutral gear as illustrated in FIG. 2. The total number of pairings of "x" and "y" depend on the total number of combinations of upshifts and downshifts in any given multi-speed transmission 100. FIG. 2, for example, may have 16 pairings as multi-speed transmission 100 is shifted up from neutral, to first, to second, . . . to seventh, to eighth, and back down to seventh, down to sixth, . . . down to neutral. The slip speed is plotted as extending between the start of a shift event (Tshiftstart) and an end of the shift event (Tshiftend).

Planetary transmission controller 203 is configured to receive and/or determine Tshiftstart and Tshiftend. In embodiments, planetary transmission controller 203 is configured to receive Tshiftstart from another portion of transmission control module 202 that regulates the occurrence of a shift event, and/or set Tshiftstart based upon a determination that a shift event should occur. Tshiftstart may correspond to the time at which planetary transmission controller 203 and/or transmission control module 202 controls the selective couplers (e.g., first selective coupler 162, second selective coupler 164, third selective coupler 166, fourth selective coupler 168, fifth selective coupler 170, and sixth selective coupler 172) to change configuration as a result of initiating a shift event (e.g., N-1, 1-2, . . . ). When planetary transmission controller 203 and/or transmission control module 202 controls the selective couplers (e.g., first selective coupler 162, second selective coupler 164, third selective coupler 166, fourth selective coupler 168, fifth selective coupler 170, and sixth selective coupler 172) to change configuration, planetary transmission controller 203 and/or transmission control module 202 may determine a time that corresponds to the change in configuration. Such determination of time may be set as Tshiftstart. In embodiments, the determination of Tshiftstart is useful to define a window over which planetary transmission controller 203 uses to monitor slip speed for one or more selective couplers so that health condition may be monitored (e.g., "Max" slip speed, Max (alltime) slip speed, and the number of shifts of a shift event). The window over which planetary transmission controller 203 monitors slip speed for one or more selective couplers so that health condition may be monitored (e.g., "Max" slip speed, Max(alltime) slip speed, and the number of shifts of a shift event) may occur until Tshiftend. In embodiments, planetary transmission controller 203 may be configured to receive Tshiftend from another portion of transmission control module 202 that regulates the occurrence of an end of a shift event, and/or may set Tshiftend based upon a determination that a shift event has ended. For example, planetary transmission controller 203 may receive an indication that a shift event has ended and determine a time that corresponds to the receipt of the indication. Alternatively, planetary transmission controller 203 may set a timer based upon the determination of Tshiftstart. When the timer expires, planetary transmission controller 203 may set Tshiftend to correspond to the time at which the timer expires. As mentioned above, slip speeds of the various selective couplers (e.g., first selective coupler 162, second selective coupler 164, third selective coupler 166, fourth selective coupler 168, fifth selective coupler 170, sixth selective coupler 172) may be monitored during the entirety of operation of multi-speed transmission 100. In embodiments, slip speeds may only be monitored during a shift window defined by Tshiftstart and Tshiftend. In embodiments, the shift window is defined between Tshiftstart and Tshiftend. In other embodiments, the shift window is defined between and inclusive of Tshiftstart and Tshiftend. In embodiments, slip speeds may only be monitored during the shift window. Health conditions (e.g., "Max" slip speed, Max(alltime) slip speed, and the number of shifts of a shift event) may be determined during the shift window.

Health monitoring by planetary transmission controller 203 described herein is not dependent upon the type of time history response. The time history illustrated in FIG. 3 is one of many different shapes that may be present in any given selective coupler during any given shift event. For example, though the time history is shown as a lightly damped second order system having an overshoot, not all selective couplers at all shift events need be represented by the same time history. In embodiments, a time history of a first selective coupler (e.g., second selective coupler 164) at a given shift event may be different than a time history of a second selective coupler (e.g., fifth selective coupler 170) at a different shift event. Some time histories may be better approximated by a first order response. Other time histories may be better approximated as a non-minimum phase system in which an initial response is in a direction opposite to a steady state response. Still other time histories may be a combination of the aforementioned approximations. Still further time histories may include one or more portions that are not approximated by a linear dynamic system. It will be appreciated that the type of slip speed response of any given selective coupler may depend on the engagement/disengagement timing and performance of the various selective couplers that participate in any given shift event. As selective couplers become worn with age, different level of performance and timing may impact the sequence of torque transmission through multi-speed transmission 100, thus creating unexpected time histories. The health of the selective couplers may impact other selective couplers and/or other components of multi-speed transmission 100 through ill timing and/or underperformance causing a chain of torque impulses that may further degrade the various selective couplers and/or other components of multi-speed transmission 100.

In a typical shift event, slip speed of any given selective coupler will vary from an initial slip speed (e.g., CNi in FIG. 3) to a final slip speed (e.g., CNj in FIG. 3). In embodiments, initial slip speed may be zero (in the case of a selective coupler that is engaged) to a non-zero value (in the case of a selective coupler that is disengaged). Further, depending upon whether slip speed is defined by subtracting speed of a driving component of the selective coupler from speed of a driven component of the selective coupler, or is defined by subtracting speed of the driven component of the selective coupler from speed of the driving component of the selective coupler, the time history may be plotted as a mirror image along the x-axis as that depicted in FIG. 3. In embodiments, the absolute value of slip speed may be plotted and evaluated.

Planetary transmission controller 203 is configured to monitor the time history and record an excursion beyond the expected limits of CNi and CNj. As stated above, slip speed of the selective coupler is expected to change from CNi to CNj. Any excursion beyond the expected change may be noted by planetary transmission controller 203. In the example illustrated in FIG. 3, the excursion of the time history may be seen in the "Max" of the time history that extends beyond CNj. "Max" as used in FIG. 3 denotes a maximum value beyond the expected bounds of CNi and CNj. If the excursion occurred early in the time history (e.g., a nonminimum phase system having an initial response in an opposite direction from steady state), the "Max" may represent the early excursion. Thus, and in light of variations in defining slip speed (see above) and whether slip speed as monitored in a time history is an absolute value, "Max" may be a value beyond a steady state value (CNi and/or CNj) that occurs as a result of a shift event. "Max" may be an excursion outside of a region between CNi and CNj beyond the second speed of the shift event i-j and/or may be an excursion outside of the region between CNi and CNj beyond the first speed of the shift event i-j. In some shift events in which the response does not include an excursion beyond the region between CNi and CNj (e.g., a first order response between CNi and CNj), "Max" may be one of the steady state values CNi and CNj.

Planetary transmission controller 203 may be configured to capture the "Max" excursion as described above across all shift events for all selective couplers. In embodiments, planetary transmission controller 203 may only monitor selective ones of the selective couplers relevant to any given shift event, and capture the "Max" of those particular selective couplers. For example, and with reference to FIG. 2, during a shift event from $1^{st}$ to $2^{nd}$, planetary transmission controller 203 may only capture the "Max" of first selective coupler 162, second selective coupler 164, and fifth selective coupler 170. Once "Max" has been determined by planetary transmission controller 203 as described above, planetary transmission controller 203 may record "Max" for health monitoring purposes and/or perform further calculations using "Max" also for health monitoring purposes.

FIG. 4 depicts data which planetary transmission controller 203 is capable of determining and/or recording. The top portion of FIG. 4 represents slip speed of a first selective coupler (C1) across all shift events with the first column representing shift events (e.g., upshift from neutral to first (N-1), upshift from first to second (1-2), . . . , upshift from seventh to eighth (7-8), downshift from eight to seventh (8-7), downshift from seventh to sixth (7-6), . . . ). Planetary transmission controller 203 may determine the average "Max" slip speed (denoted as "Avg Max" in FIG. 4) at the same shift event across time of C1 in the second column. For example, any time multi-speed transmission 100 shifts from neutral to first (N-1), planetary transmission controller 203 may determine the "Max" slip speed and average that "Max" slip speed with the "Max" slip speed of the same shift from neutral to first (N-1) that occurred at a different moment in time. The "Avg Max" in the second column of data for C1 may represent, therefore, the average "Max" slip speed across a given number of shift events. Planetary transmission controller 203 also tracks the number of shifts that have occurred to aid in calculating the average "Max" slip speed. In embodiments, planetary transmission controller 203 is configured to average the "Max" slip speed of a first set of shifts at a particular shift event (e.g., N-1, 1-2, etc.) of any given selective coupler (e.g., C1). For example, in embodiments, planetary transmission controller 203 may be configured to average the "Max" slip speed of the first 50 shifts at a particular shift event (e.g., N-1, or 1-2, or 2-3, etc.) of any given selective coupler (e.g., C1). After the first set of shifts of any given shift event has transpired, planetary transmission controller 203 may use a different determination of the average "Max" slip speed. For example, in embodiments, planetary transmission controller 203 may determine average "Max" slip speed after the first set of shifts at a particular shift event to a scheme that weights any given shift by a fraction of its value (e.g., a "weight value"), thus providing a weighted average that may be more responsive to changes over time in "Max" slip speed. In embodiments, planetary transmission controller 203 may determine average "Max" slip speed after the first 50 shifts at a particular shift event to a scheme that weights any given shift by 1/50th of its value, thus providing a weighted average that may be more responsive to changes over time in "Max" slip speed. The recorded "Avg Max" average "Max" slip speed in the top portion of FIG. 4 thus may be determined using a first approach at a shift count less than or equal to a first set of shifts (e.g., any shift that occurs in the first 50 shifts of a shift event, sometimes referred to as a 'calibration mode') and then a second approach at a shift count greater than the first set of shifts (e.g., any shift that occurs after the first 50 shifts, sometimes referred to as a 'normal mode'). The first set of shifts may be set in planetary transmission controller 203 by a user. For example, planetary transmission controller 203 may have a value set by a user that planetary transmission controller 203 refers to in determining whether to use a first approach at determining the average "Max" slip speed for a first set of shifts or a second approach at determining the average "Max" slip speed for a second set of shifts.

The top portion of FIG. 4 also includes a column for "Max(alltime)" which represents a determination across all time of the "Max" slip speed for a particular shift event (e.g., N-1, 1-2, etc.) for a particular selective coupler. The Max (alltime) value may be updated after a current shift of a particular shift event if it is determined that the "Max" slip speed exceeds a value currently recorded for Max(alltime). For example, if, during a current shift of a particular shift event, the "Max" slip speed exceeds the Max(alltime), then Max(alltime) is updated to reflect the "Max" slip speed of the current shift.

The bottom portion of FIG. 4 represents the nth number of selective couplers in which slip speed is monitored. "Cn" thus represents the nth slip speed related to the nth selective coupler. Data associated with the nth selective coupler at the bottom of FIG. 4 is determined in the same manner as discussed above with respect to C1 in the top portion of FIG. 4. Other selective couplers are also tracked in the same manner as indicated by the vertical ellipses between the top portion of FIG. 4 and the bottom portion of FIG. 4.

It will be appreciated that planetary transmission controller 203 may be configured to receive high-rate data (e.g., 10 Hertz (Hz), 20 Hz, 50 Hz, 100 Hz) from first sensor 204, second sensor 206, and third sensor 208, determine "Max" slip speed, determine the number of shifts at a particular shift event, compute an average "Max" slip speed ("Avg max"), compare Max(alltime) slip speed, and record the same for health condition monitoring. Advantages of multi-speed transmission 100 receiving data from first sensor 204, second sensor 206, and third sensor 208 as well as monitoring a health condition of multi-speed transmission 100 include the ability to quickly assess and/or quickly archive data for evaluation. Monitoring changes in the average "Max" slip speed, changes in Max(alltime) slip speed, against a shift event of a particular selective coupler may provide an indication of excessive wear of one or more components of multi-speed transmission 100 that are masked by the operational performance of other components of multi-speed transmission 100.

Figure 5:
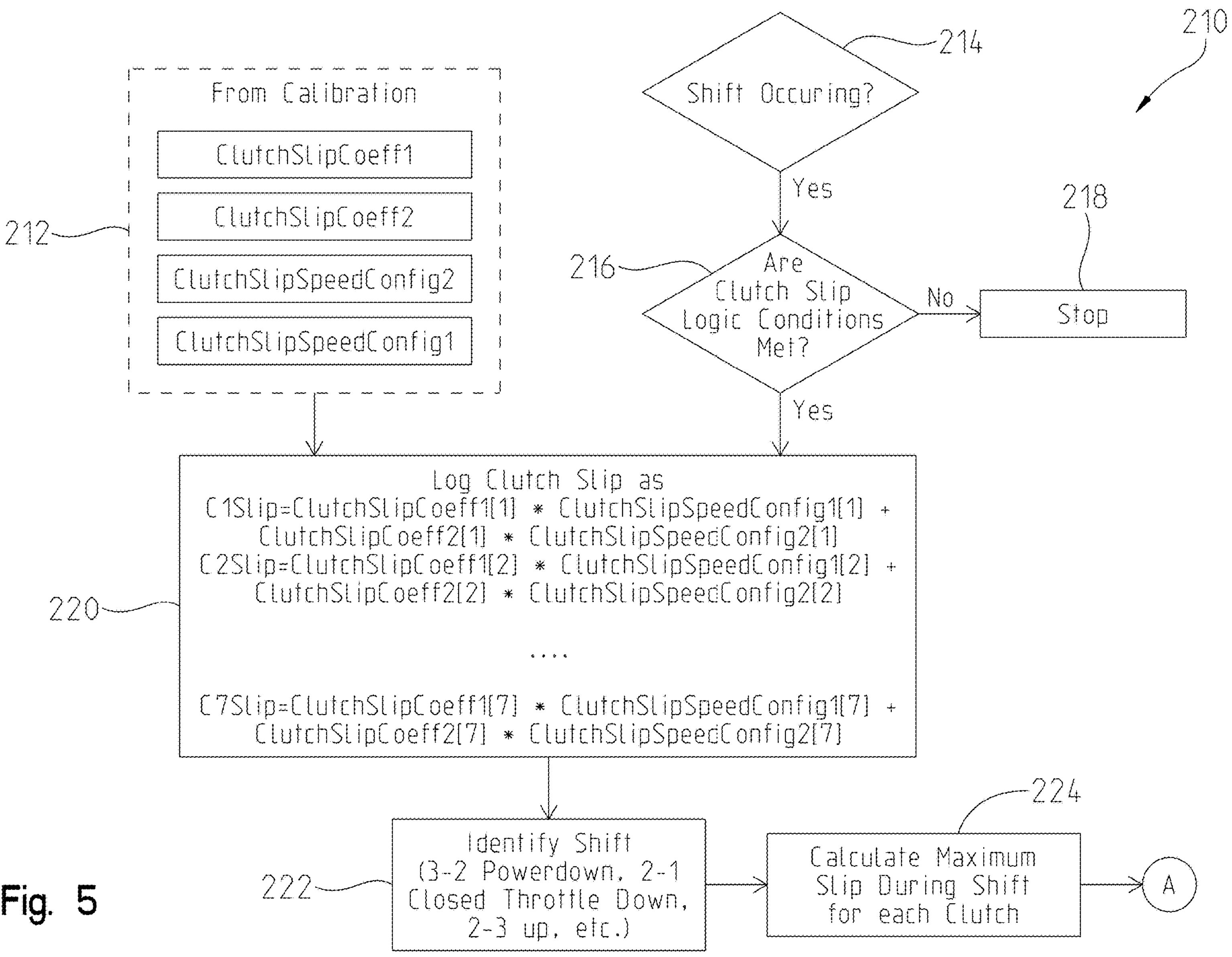
FIG. 5 depicts a first portion of a flow diagram implemented in a planetary transmission controller.
Figure 6:
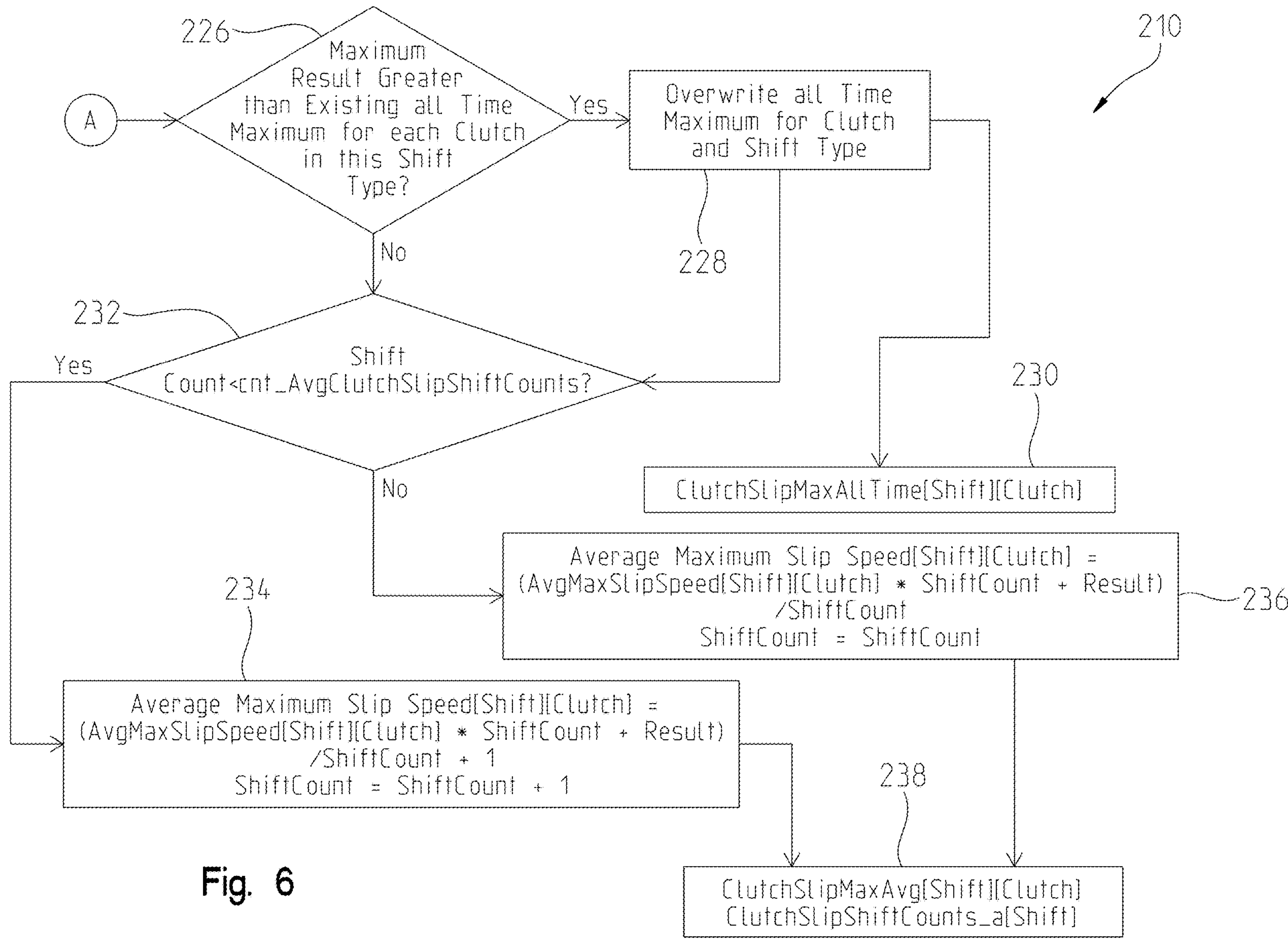
FIG. 6 depicts a continuing portion of the flow diagram depicted in FIG. 5.

Turning now to FIGS. 5 and 6, a flow diagram 210 is disclosed of an embodiment of planetary transmission controller 203 in which "Max" slip speed, Max(alltime) slip speed, and shift number, among potential others, are determined. FIG. 5 illustrates a first portion of flow diagram 210, while FIG. 6 illustrates a remaining portion of flow diagram 210. Block 212 depicts a set of values that are available for use in planetary transmission controller 203 in the determination of "Max" slip speed and Max(alltime) slip speed. The values depicted in block 212 may be resident in a memory of transmission control module 202 which may be preloaded into and/or saved in real-time by a variety of memory processes. Block 212 includes the coefficients used in the equations above in which a first speed multiplied by a coefficient added to a second speed multiplied by a coefficient may be used to determine slip speed of a selective coupler. The coefficients are stored in two separate variable arrays in block 212: ClutchSlipCoeff1 and ClutchSlipCoeff2, wherein each of the two variable arrays includes an array of values that are used to multiply by various speeds. As will be appreciated with the discussion herein, the array of coefficients included in each of ClutchSlipCoeff1 and ClutchSlipCoeff2 may include non-zero values (both positive and negative), and in one example, may include one or more values of 1. Block 212 also includes an array of speeds, including speeds associated with one or more components of multi-speed transmission 100 (e.g., speeds measured by first sensor 204, second sensor 206, and third sensor 208), and/or slip speeds associated with selective couplers (e.g., first selective coupler 162, second selective coupler 164, third selective coupler 166, fourth selective coupler 168, fifth selective coupler 170, and/or sixth selective coupler 172). The array of speeds are stored in two separate variable arrays ClutchSlipSpeedConfig1 and ClutchSlipSpeedConfig2 and may represent current estimates/calculations of speeds used in the equations above. In some cases, the estimates/calculations of speeds stored in the array of speeds may be shifted in time owing to differences in measurements made by sensors (e.g., first sensor 204, second sensor 206, and third sensor 208) and calculations of speeds (e.g., calculation of C2Slip used in Eq. 1). It is anticipated that the slight difference, if any, is negligible for the dynamics associated with multi-speed transmission 100.

Flow diagram 210 begins at decision block 214 in which it is determined whether a shift is occurring. If the result of decision block 214 is NO, flow diagram 210 may loop back to decision block 214 to continuously test whether a shift is occurring. If the result of decision block 214 is YES, flow diagram 210 progresses to decision block 216. Decision block 216 determines whether slip logic conditions are met. The conditions that contribute to whether slip logic conditions are met may include whether the planetary transmission controller 203 is monitoring data within the shift window (e.g., the shift window described elsewhere herein). To set forth one example of the interplay between decision block 214 and decision block 216, although transmission control module 202 and/or planetary transmission controller 203 have determined that a shift event should occur and has initiated the process of completing a shift (decision block 214 resulting in YES), the shift window may not have opened yet as the shift may involve other activities prior to commanding a selective coupler. If decision block 216 determines that clutch slip logic is not met, flow diagram 210 may stop at stop block 218. In embodiments, flow diagram 210 may, instead of progressing to stop block 218, return to decision block 214. When decision block 216 determines that clutch slip logic conditions are met, flow diagram 210 progresses to block 220 to determine each slip speed of the selective couplers (e.g., first selective coupler 162, second selective coupler 164, third selective coupler 166, fourth selective coupler 168, fifth selective coupler 170, sixth selective coupler 172).

Block 220 illustrates several examples of equations using values from the arrays in block 212 to determine slip speeds. The equations in block 220 may track the equations discussed elsewhere above. For example, C1Slip in block 220 may be calculated by multiplying the first value in the first coefficient array with the first value in the first speed array and summing the result of that multiplication with the first value in the second coefficient array with the first value in the second speed array. As mentioned above, one or more of the coefficients in the first coefficient array and/or the second coefficient array may be 1. Block 220 also includes the calculation of C7Slip. Although the examples provided herein contemplate the use of six selective couplers, block 220 illustrates that other embodiments of multi-speed transmission 100 may include additional selective couplers owing to a difference in architecture (e.g., different number of planetary gear sets, interconnectors, gear ratios, etc.).

Block 222 identifies the shift identity. Example shifts include 3-2 power down, 2-1 closed throttle down, 2-3 up, etc. Block 224 determines "Max" slip speed for a particular selective coupler (as described elsewhere herein) at the particular shift event identified in block 222. The value of "Max" slip speed for a particular selective coupler at a particular shift event may be stored in memory for use elsewhere in flow diagram 210. Decision block 226 evaluates whether "Max" slip speed determined in block 224 for a particular selective coupler at a particular shift event is greater than a stored value of "Max" slip speed for the same particular selective coupler at a particular shift event, resulting in either maintaining Max(alltime) or updating Max (alltime) for a particular selective coupler at a particular shift event depending on the evaluation. If "Max" slip speed determined in block 224 for a particular selective coupler at a particular shift event is greater than a stored value of "Max" slip speed for the same particular selective coupler at a particular shift event, decision block 226 progresses to block 228 to overwrite Max(alltime) with "Max" slip speed determined in block 224 as illustrated at step 230. If "Max" slip speed determined in block 224 for a particular selective coupler at a particular shift event is greater than a stored value of "Max" slip speed for the same particular selective coupler at a particular shift event, shift count (illustrated in the far-right column of the tables depicted in FIG. 4) which represents the current total number of shifts that have occurred for a particular selective coupler at a particular shift event is tested against a variable at decision block 232 to determine how to treat the "Max" slip speed. Specifically, decision block 232 will dictate whether planetary transmission controller 203 is in a calibration mode or a normal mode. As described herein, planetary transmission controller 203 is configured to treat a first set of shifts in a calibration mode where the shifts are analyzed according to schema associated with the calibration mode, and treat subsequent shifts in a normal mode where the shifts are analyzed according to schema associated with the normal mode. In FIG. 6, if the result from block 232 is 'Yes,' planetary transmission controller 203 will treat the data in a calibration mode. If the result from block 232 is 'No,' planetary transmission controller 203 will treat the data in a normal mode. The variable AvgClutchSlipShiftCounts represents a number of shifts below which "Max" slip speed is treated in one manner outlined in block 234 (calibration mode) and at or above which "Max" slip is treated in another manner outlined in block 236 (normal mode). The inequality set forth in decision block 232 may be expressed as a "less than or equal to" in lieu of a "less than" operation, depending upon the needs of any given application. Block 234 averages "Max" slip speed with all previous "Max" slip speeds for a particular selective coupler at a particular shift event to form "Avg Max" (illustrated in the second column from the left in any given table depicted in FIG. 4). The shift count (represented at the far-right column of a table in FIG. 4) is increased by one. For purposes of the logic in block 234 and block 236, the shift count (e.g., represented as 'ShiftCount' in the figures) is initialized at zero. Block 236 does not increment shift count and weights the "Max" slip speed (e.g., adjusts it by a weight value) by the fixed shift count (fixed as a result of no longer incrementing the shift count) so as to form a running "Avg Max." Values for "Avg Max" and shift count may be stored at block 238.

Figure 7:
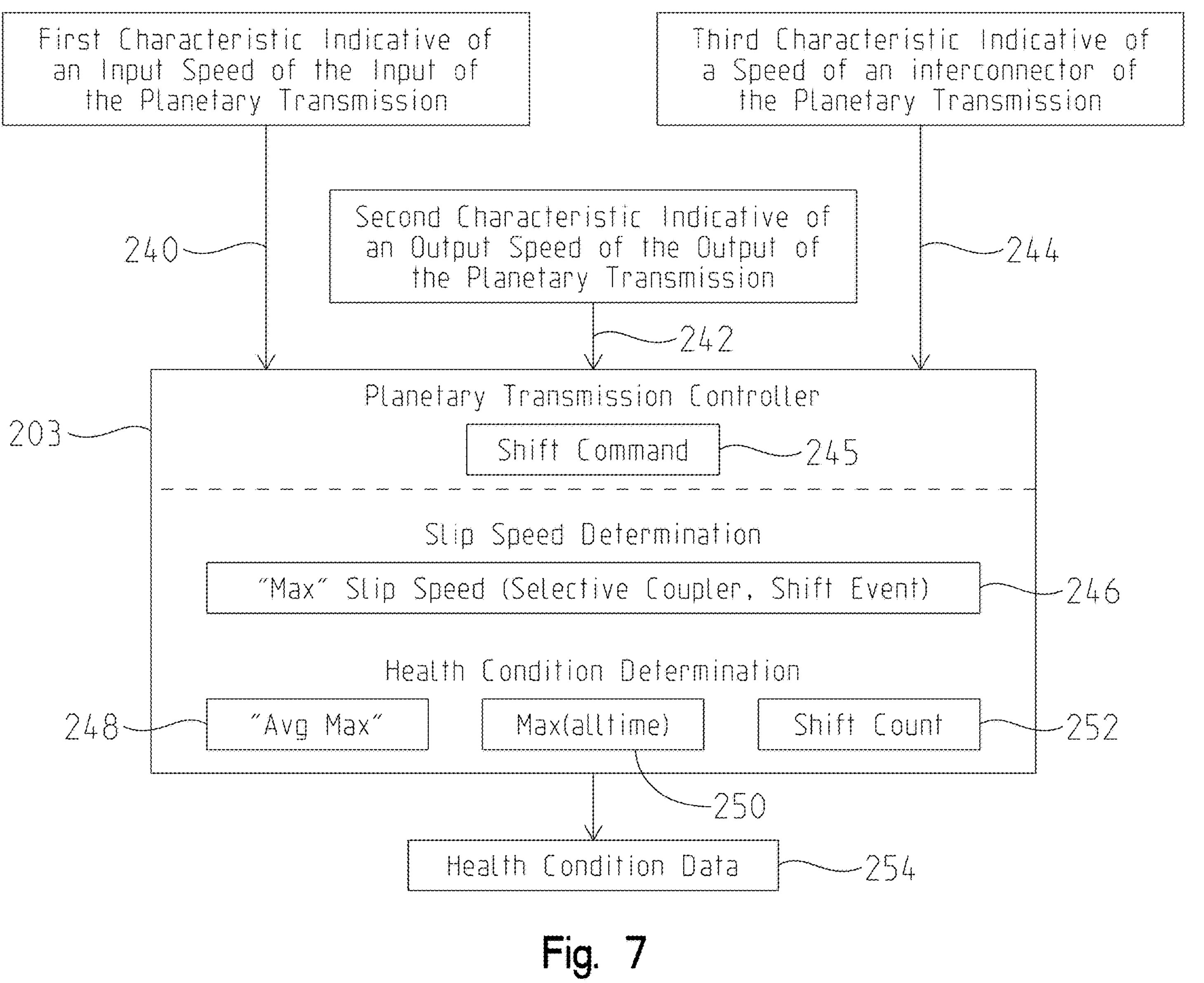
FIG. 7 depicts a planetary transmission controller useful in the control and/or monitoring of a multi-speed transmission.

Turning now to FIG. 7, planetary transmission controller 203 is illustrated having a first input 240, a second input 242, and a third input 244 that includes signals having, respectively, a first characteristic indicative of an input speed of input member 102 of multi-speed transmission 100, a second characteristic indicative of an output speed of output member 104 of multi-speed transmission 100, and a third characteristic indicative of an interconnector of multi-speed transmission 100 that may rotate independent of input member 102 of multi-speed transmission 100 and may rotate independent of output member 104 of multi-speed transmission 100. As mentioned elsewhere herein, each of first input 240, second input 242, and/or third input 244 may be provided to transmission control module 202 and thence to planetary transmission controller 203 or may be provided direct to planetary transmission controller 203 (e.g., a wired connection or wireless connection). First input 240, second input 242, and/or third input 244 may be raw data (e.g., an analog voltage that encodes the first characteristic, second characteristic, and third characteristic) or processed data (e.g., a data packet over network communication). In embodiments, upon receipt of first input 240, second input 242, and third input 244, planetary transmission controller 203 is configured to determine Tshiftstart based on a shift command 245 that may be provided to planetary transmission controller 203 and/or determined internally by planetary transmission controller 203 when commanding a shift event of multi-speed transmission 100. Planetary transmission controller 203 may calculate "Max" slip speed 246 indexed to a particular selective coupler and a particular shift event, and thereafter determine "Avg Max" 248, Max (alltime) 250, and shift count 252. Each of "Avg Max" 248, Max(alltime) 250, and shift count 252 may also be indexed to a particular selective coupler and a particular shift event. In embodiments, planetary transmission controller 203 may archive data local to memory and download health condition data 254 upon command (e.g., a technician commanding a download of information), or may transmit health condition data 254 for archiving elsewhere. In embodiments, planetary transmission controller 203 may transmit "Max" slip speed 246 for processing elsewhere.

Figure 8:
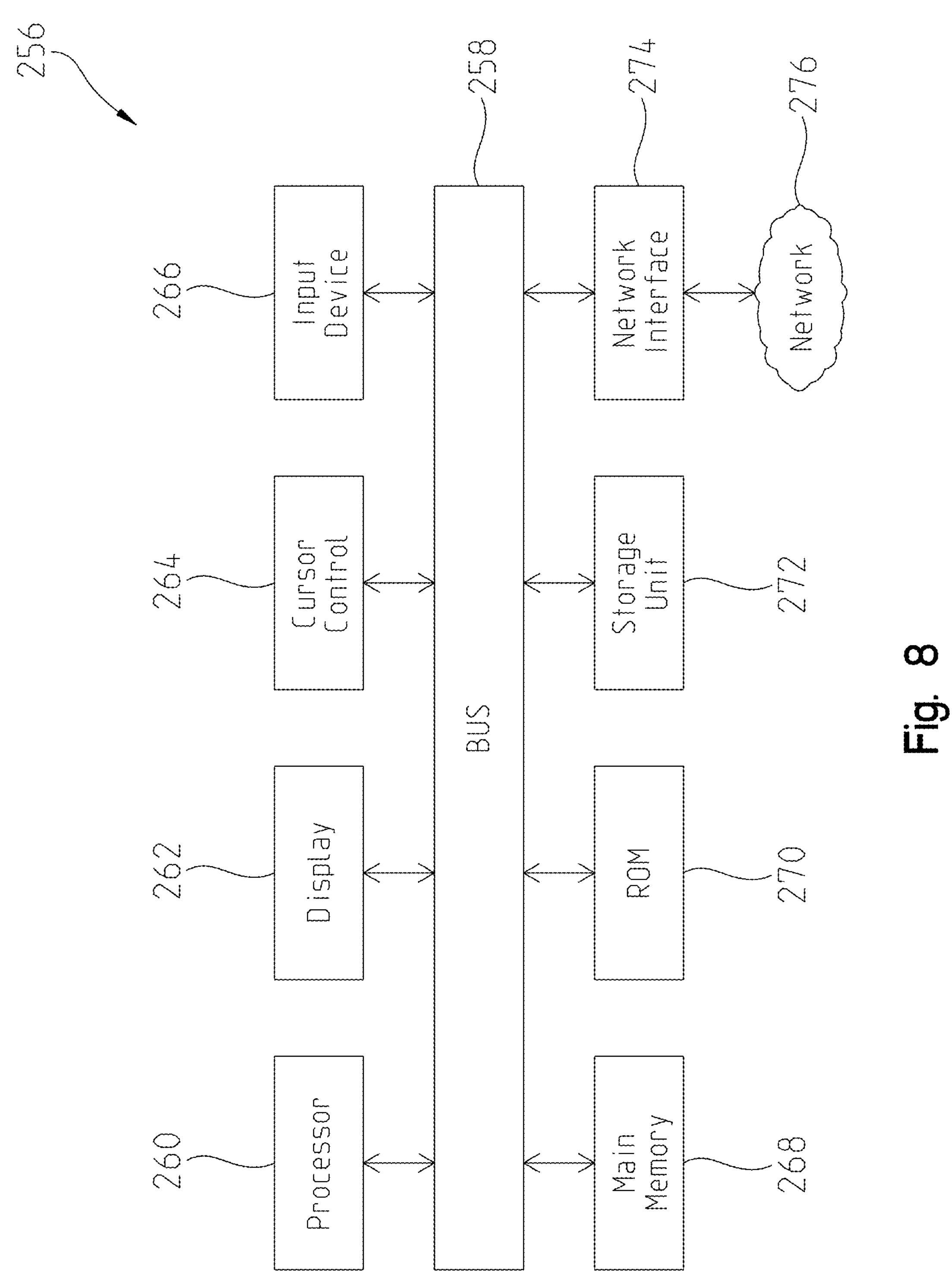
FIG. 8 illustrates a diagram of a computing system useful in implementing a planetary transmission controller.

FIG. 8 illustrates a diagram of a computing system 256 for implementing one or more aspects of transmission control module 202 and/or planetary transmission controller 203, in accordance with certain embodiments of the present disclosure. For example, some or all of the functions of planetary transmission controller 203 may be performed by a computing system that has similar components as the computing system 256. This diagram is merely an example, which should not unduly limit the scope of the claims. One of ordinary skill in the art would recognize many variations, alternatives, and modifications.

Computing system 256 includes a bus 258 or other communication mechanism for communicating information between a processor 260, a display 262, a cursor control component 264, an input device 266, a main memory 268, a read only memory (ROM) 270, a storage unit 272, and/or a network interface 274. In embodiments, bus 258 is coupled to processor 260, display 262, cursor control component 264, input device 266, main memory 268, read only memory (ROM) 214, storage unit 272, and/or network interface 274. In embodiments, the network interface 274 is coupled to a network 276. Computing system 256 illustrated in FIG. 8 may be used in a remote computing environment in which a user (e.g., a technician) may inspect data monitored by the planetary transmission controller 203 via display 262, input device 266, and cursor control component 264. In embodiments, computing system 256 may include fewer components. For example, in embodiments, computing system 256 may not include display 262, cursor control component 264, and input device 266. Other variations of computing system 256 are contemplated herein. Such an example be one in which planetary transmission controller 203 monitors and retains data for later download by a technician.

In embodiments, processor 260 includes one or more general purpose microprocessors. In embodiments, main memory 268 (e.g., random access memory (RAM), cache and/or other dynamic storage devices) is configured to store information and instructions to be executed by processor 260. In embodiments, main memory 268 is configured to store temporary variables or other intermediate information during execution of instructions to be executed by processor 260. For example, the instructions, when stored in storage unit 272 accessible to processor 260, render computing system 256 into a special-purpose machine that is customized to perform the operations specified in the instructions. In embodiments, ROM 270 is configured to store static information and instructions for processor 260. In embodiments, storage unit 272 (e.g., a magnetic disk, optical disk, or flash drive) is configured to store information and instructions.

Thus, computing system 256 may include at least some form of computer readable media. The computer readable media may be any available media that may be accessed by processor 260 or other devices. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may not include communication media.

In embodiments, display 262 (e.g., a cathode ray tube (CRT), an LCD display, or a touch screen) is configured to display information to a user of computing system 256. In some examples, input device 266 (e.g., alphanumeric and other keys) is configured to communicate information and commands to processor 260. For example, cursor control 264 (e.g., a mouse, a trackball, or cursor direction keys) is configured to communicate additional information and commands (e.g., to control cursor movements on the display 262) to processor 260.

In the illustrated embodiment, various combinations of two of the available selective couplers are engaged for each of the illustrated forward speed ratios. Additional forward speed ratios and reverse speed ratios are possible based on other combinations of engaged selective couplers. Although in the illustrated embodiment, each forward speed ratio has two of the available selective couplers engaged, it is contemplated that less than two and more than two selective couplers may be engaged at the same time.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for controlling a planetary transmission having a plurality of planetary gearsets and a plurality of selective couplers, the planetary transmission being driven by a prime mover at an input of the planetary transmission and driving a driven component at an output of the planetary transmission, the plurality of selective couplers are selectively engaged in a plurality of combinations to establish a plurality of speed ratios between the input of the planetary transmission and the output of the planetary transmission, the method comprising the steps of:

receiving a first characteristic indicative of an input speed of the input of the planetary transmission;

receiving a second characteristic indicative of an output speed of the output of the planetary transmission;

receiving a third characteristic indicative of an interconnector of the planetary transmission that may rotate independent of the input of the planetary transmission and may rotate independent of the output of the planetary transmission;

in response to a first shift event of the planetary transmission from a first combination of the plurality of combinations of the selective couplers corresponding to a first speed ratio of the plurality of speed ratios to a second combination of the plurality of combinations of the selective couplers corresponding to a second speed ratio of the plurality of speed ratios, determining for at least a subset of the plurality of selective couplers from the first shift event based on at least two of the received first characteristic, the received second characteristic, and the received third characteristic an estimated slip speed for each selective coupler in the at least subset of the plurality of selective couplers;

determining a maximum estimated slip speed during the shift window for each selective coupler in the at least subset of the plurality of selective couplers;

comparing a current maximum slip speed for each selective coupler in the at least subset of the plurality of selective couplers to an all-time maximum slip speed for each corresponding selective coupler in the at least subset of the plurality of selective couplers, and if the current maximum slip speed for any of each selective coupler in the at least subset of the plurality of selective couplers exceeds the all-time maximum slip speed for each corresponding selective coupler in the at least subset of the plurality of selective couplers, updating, respectively, the all-time maximum slip speed for each corresponding selective coupler in which the current maximum slip speed for a respective selective coupler in the at least subset of the plurality of selective couplers that exceeds the all-time maximum slip speed for the respective selective coupler in the at least subset of the plurality of selective couplers.

2. The method of claim 1, wherein the step of determining the estimated slip speed is configured to occur in a shift window between a start of the shift event and a termination of the shift event, wherein the shift window includes a time period at least partially overlapping the first shift event.

3. The method of claim 1, wherein the step of determining the estimated slip speed is performed between a start of the shift event and a termination of the shift event at a frequency corresponding to a plurality of times every second.

4. The method of claim 2, wherein a plurality of estimated slip speeds for a first subset of selective couplers during the first shift event is determined with less than each of the first characteristic, second characteristic, and third characteristic.

5. A planetary transmission controller configured to execute the steps of claim 1.

6. The planetary transmission controller of claim 5, further comprising:

a first speed sensor configured to transmit the first characteristic indicative of an input speed;

a second speed sensor configured to transmit the second characteristic indicative of an output speed; and a third speed sensor configured to transmit the third characteristic indicative of an interconnector speed.

7. The planetary transmission controller of claim 6, wherein the third characteristic is indicative of a speed of an interconnector that fixedly couples a first gear component of a first planetary gearset of the plurality of planetary gearsets and a second gear component of a second planetary gearset of the plurality of planetary gearsets.

8. A method for controlling, using a planetary transmission controller, a planetary transmission having a plurality of planetary gearsets and a plurality of selective couplers, the planetary transmission being driven by a prime mover at an input of the planetary transmission and driving a driven component at an output of the planetary transmission, the plurality of selective couplers are selectively engaged in a plurality of combinations to establish a plurality of speed ratios between the input of the planetary transmission and the output of the planetary transmission, the method comprising:

receiving a first characteristic indicative of a first speed of a first component of the transmission;

receiving a second characteristic indicative of a second speed of a second component of the transmission;

across a plurality of shift events of the plurality of selective couplers, estimate a slip speed of at least a subset of the plurality of selective couplers based on the first characteristic and the second characteristic;

capturing a maximum slip speed for the subset of the plurality of selective couplers during a shift event of the plurality of shift events to monitor a health condition of the subset of selective couplers; and wherein the planetary transmission controller includes a calibration mode for each shift type and a normal mode for each shift type, where each shift type includes a change in state of the plurality of selective couplers from one of the plurality of speed ratios to another of the plurality of speed ratios, wherein in the calibration mode for each shift type, increasing a shift count by one for each shift event of the shift type, and determining an average maximum slip speed for each selective coupler for each shift event in the calibration mode.

9. The method of claim 8, further comprising:

receiving a third characteristic indicative of a third speed of a third component of the transmission; and across the plurality of shift events of the plurality of selective couplers, estimating a slip speed of each of the plurality of selective couplers based on two of the first characteristic and the second characteristic and the third characteristic.

10. The method of claim 9, wherein the first characteristic is indicative of an input speed of the planetary transmission; wherein the second characteristic is indicative of an interconnector speed of the planetary transmission; and wherein the third characteristic is indicative of an output speed of the planetary transmission.

11. The method of claim 10, wherein the planetary transmission includes a first subset of the plurality of selective couplers, wherein the planetary transmission includes a second subset of the plurality of selective couplers, wherein slip speeds for each of the first subset of the plurality of selective couplers are estimated based on a first pairing of the first characteristic and the second characteristic and the third characteristic, and wherein slip speeds for each of the second subset of the plurality of selective couplers is based on a second pairing of the first characteristic and the second characteristic and the third characteristic, and wherein the first pairing is different than the second pairing.

12. The method of claim 8, wherein in the normal mode for each shift type the shift count does not increase by one for each shift event of the shift type.

13. The method of claim 12, wherein in the normal mode for each shift type, the planetary transmission controller is configured to adjust an average maximum slip speed for each selective coupler by a weight value of a current maximum slip speed.

14. The method of claim 8, wherein the planetary transmission controller is configured to compare a current maximum slip speed for at least one selective coupler of a first shift event to an all-time maximum slip speed for the at least one selective coupler of the first shift event, and if the current maximum slip speed for the at least one selective coupler of the first shift event exceeds the all-time maximum slip speed for the at least one selective couplers of the first shift event, update the all-time maximum slip speed for the at least one selective coupler of the first shift event to the current maximum slip speed of the at least one selective coupler of the first shift event.

15. A planetary transmission comprising:

at least one stationary member;

an input member rotatable relative to the at least one stationary member;

a plurality of planetary gearsets operatively coupled to the input member, each of the plurality of planetary gearsets including a first gearset component, a second gearset component rotatable relative to the first gearset component, and a third gearset component rotatable relative to the second gearset component;

an output member operatively coupled to the input member through the plurality of planetary gearsets and rotatable relative to the at least one stationary member;

a plurality of selective couplers, wherein the plurality of selective couplers includes a first number of clutches and a second number of brakes, the plurality of selective couplers are selectively engaged in a plurality of combinations to establish a plurality of speed ratios between the input of the planetary transmission and the output of the planetary transmission;

a plurality of sensors including a first sensor of the plurality of sensors positioned to monitor a characteristic indicative of an input speed of the input member, a second sensor of the plurality of sensors positioned to monitor a characteristic indicative of an output speed of the output member, and a third sensor of the plurality of sensors positioned to monitor a characteristic indicative of a speed of an interconnector of the planetary transmission, the interconnector may rotate independent of the input member of the planetary transmission and may rotate independent of the output member of the planetary transmission;

a planetary transmission controller configured to determine slip speed of each of the subset of the plurality of selective couplers based on data received from the plurality of sensors, the planetary transmission controller further configured to:

capture a maximum slip speed for the subset of the plurality of selective couplers during a shift event of the plurality of shift events to monitor a health condition of the subset of selective couplers; and monitor excursions in a health condition of any one of the subset of the plurality of selective couplers during the shift event based on maximum slip speed of the respective any one of the subset of the plurality of selective couplers.

16. The planetary transmission of claim 15, wherein the plurality of planetary gearsets each include a first planetary gearset, a second planetary gearset, a third planetary gearset, and a fourth planetary gearset, and wherein the input member is fixedly coupled to the second gearset component of the first planetary gearset.

17. The planetary transmission of claim 15, wherein the output member is fixedly coupled to the third gearset component of a planetary gearset of the plurality of planetary gearsets and to the second gearset component of another planetary gearset of the plurality of planetary gearsets.

18. The planetary transmission of claim 15, wherein the plurality of planetary gearsets includes a first planetary gearset, a second planetary gearset, and a third planetary gearset, and wherein the interconnector fixedly couples at least a portion of the first planetary gearset, at least a portion of the second planetary gearset, and at least a portion of the third planetary gearset.

19. The planetary transmission of claim 15, wherein the interconnector fixedly couples the third gearset component from the first planetary gearset, the first gearset component from the second planetary gearset, and the first gearset component from the third planetary gearset.

20. The planetary transmission of claim 19, wherein the plurality of selective couplers are selectively engaged in a plurality of combinations to establish at least eight forward speed ratios between the input member and the output member, each of the plurality of combinations having at least two of the plurality of selective couplers engaged.

21. The planetary transmission of claim 20, wherein a total number of the plurality of selective couplers is higher than a total number of the plurality of sensors.

22. The planetary transmission of claim 15, wherein the plurality of sensors are Hall effect sensors affixed to remain static relative to the at least one stationary member.

23. The planetary transmission of claim 15, further comprising a planetary transmission controller in data communication with each of the first sensor, the second sensor, and the third sensor.

* * * * *